(12) United States Patent
Koshiyama

(10) Patent No.: US 9,731,550 B2
(45) Date of Patent: Aug. 15, 2017

(54) BICYCLE HUB ASSEMBLY

(71) Applicant: SHIMANO INC., Sakai (JP)

(72) Inventor: Kazuki Koshiyama, Sakai (JP)

(73) Assignee: SHIMANO INC., Sakai (JP)

(*) Notice: Subject to any disclaimer, the term of this patent is extended or adjusted under 35 U.S.C. 154(b) by 528 days.

(21) Appl. No.: 14/267,958

(22) Filed: May 2, 2014

(65) Prior Publication Data
US 2015/0314641 A1    Nov. 5, 2015

(51) Int. Cl.
  *B60B 27/04* (2006.01)
  *B60B 27/00* (2006.01)
  *B60B 27/02* (2006.01)

(52) U.S. Cl.
  CPC .......... *B60B 27/04* (2013.01); *B60B 27/0015* (2013.01); *B60B 27/023* (2013.01); *B60B 27/047* (2013.01); *B60B 27/026* (2013.01); *B60B 2900/112* (2013.01); *B60B 2900/212* (2013.01); *B60B 2900/325* (2013.01); *B60Y 2200/13* (2013.01)

(58) Field of Classification Search
  CPC ...... B60K 17/043; B60K 17/06; B60K 17/08; B60B 27/00; B60B 27/0021; B60B 27/0026; B60B 274/04; B60B 27/047; B60B 27/023; F16D 41/00; F16D 41/24; F16D 41/30; F01D 5/026
  USPC ............... 301/6.5, 6.9, 110.5–110.6; 192/64, 192/217.4, 217.5; 474/116, 160; 403/359.1–359.2, 359.5–359.6; 74/496, 74/498
  See application file for complete search history.

(56) References Cited

U.S. PATENT DOCUMENTS

| 8,096,623 B2 | 1/2012 | You |
| 8,371,660 B2 | 2/2013 | Shook |
| 2005/0009654 A1 | 1/2005 | Kanehisa et al. |
| 2008/0315679 A1 | 12/2008 | Shook |
| 2011/0175433 A1 | 7/2011 | Chiang |
| 2011/0193406 A1 | 8/2011 | Chiang |
| 2013/0076112 A1 | 3/2013 | Tho |

FOREIGN PATENT DOCUMENTS

CN 201646251 U 11/2010

*Primary Examiner* — Jason Bellinger
(74) *Attorney, Agent, or Firm* — Mori & Ward, LLP

(57) ABSTRACT

A bicycle hub assembly includes a hub axle, a hub shell, and a sprocket supporting member. The sprocket supporting member includes a tubular portion and a first tooth. The tubular portion includes an outer peripheral surface and an attachment portion provided only radially inward of the outer peripheral surface. The first tooth is configured to be attached to the attachment portion of the tubular portion. The first tooth includes a first surface and a second surface. The first surface is configured to face a mounting portion of a bicycle sprocket in a circumferential direction of the sprocket supporting member. The second surface is opposite to the first surface in the circumferential direction. The second surface is configured to face the mounting portion of the bicycle sprocket in the circumferential direction.

22 Claims, 21 Drawing Sheets

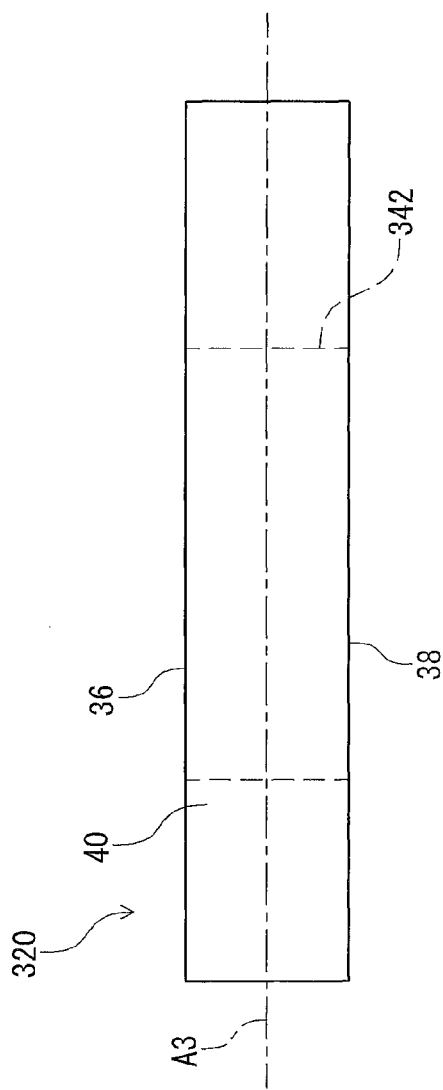
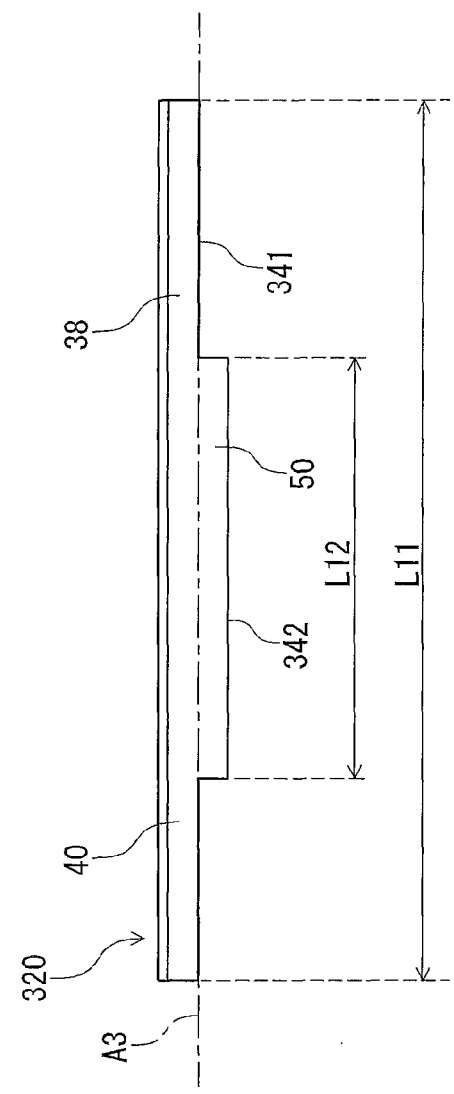
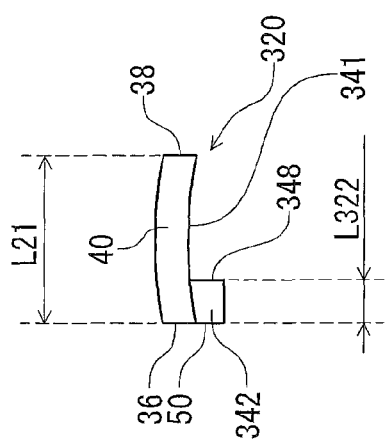
FIG. 13
FIG. 14
FIG. 15

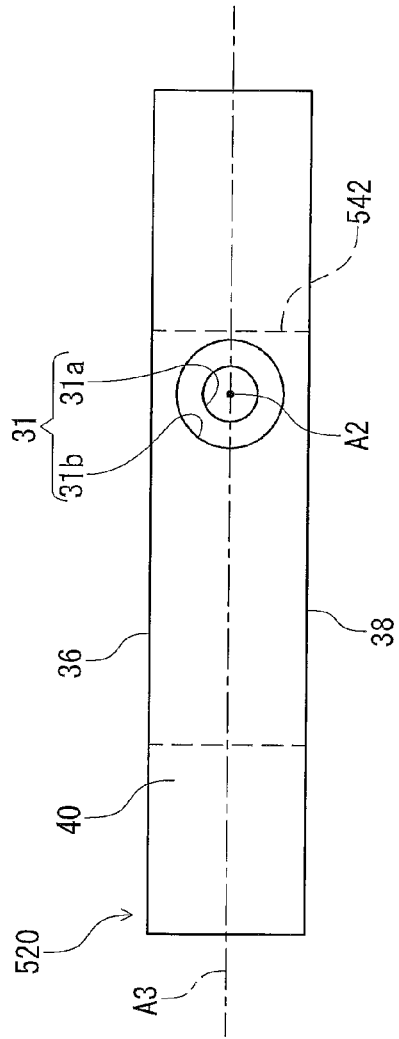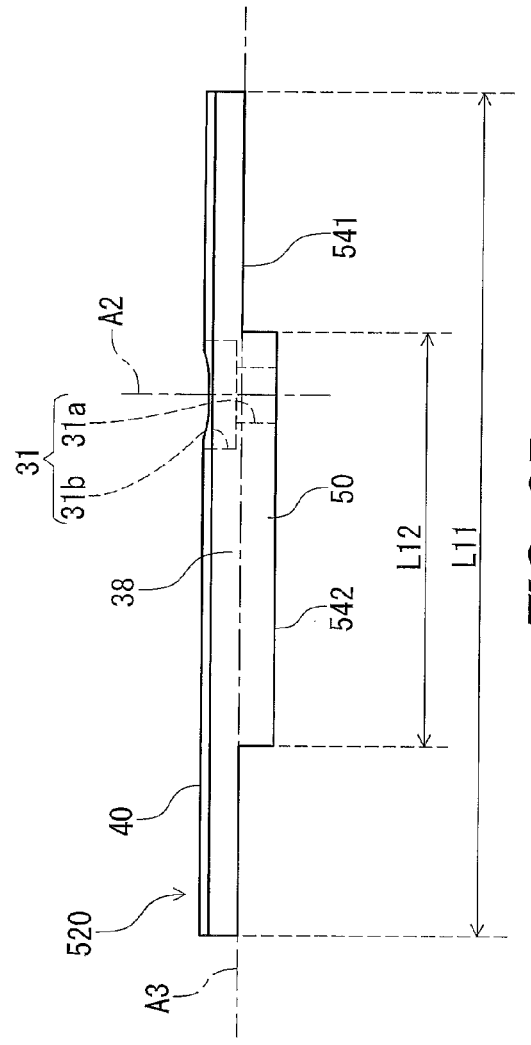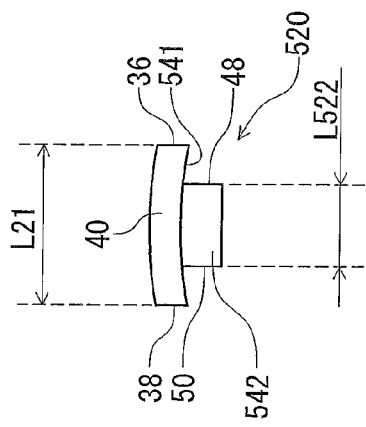

BICYCLE HUB ASSEMBLY

BACKGROUND OF THE INVENTION

Field of the Invention

The present invention relates to a bicycle hub assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle hub assembly.

SUMMARY OF THE INVENTION

In accordance with a first aspect of the present invention, a bicycle hub assembly comprises a hub axle, a hub shell, and a sprocket supporting member. The hub shell is rotatable relative to the hub axle about a rotational axis. The sprocket supporting member is rotatable relative to the hub axle about the rotational axis and is configured to support a bicycle sprocket to be integrally rotatable with the sprocket supporting member about the rotational axis. The sprocket supporting member comprises a tubular portion and a first tooth. The tubular portion includes an outer peripheral surface and an attachment portion provided only radially inward of the outer peripheral surface. The tubular portion is made of a first material. The first tooth is configured to be attached to the attachment portion of the tubular portion and is made of a second material different from the first material. The first tooth comprises a first surface and a second surface. The first surface is configured to face a mounting portion of the bicycle sprocket in a circumferential direction of the sprocket supporting member. The second surface is opposite to the first surface in the circumferential direction. The second surface is configured to face the mounting portion of the bicycle sprocket in the circumferential direction.

In accordance with a second aspect of the present invention, the bicycle hub assembly according to the first aspect is configured so that the attachment portion includes a recess provided on the outer peripheral surface of the tubular portion. The first tooth includes a tooth body and a protrusion. The tooth body includes the first surface and the second surface. The tooth body is configured to be provided on the outer peripheral surface of the tubular portion in a state where the first tooth is attached to the tubular portion via the attachment portion. The protrusion protrudes from the tooth body and is configured to be disposed in the recess.

In accordance with a third aspect of the present invention, the bicycle hub assembly according to the second aspect is configured so that the recess extends in an axial direction parallel to the rotational axis.

In accordance with a fourth aspect of the present invention, the bicycle hub assembly according to the second aspect is configured so that the recess has a maximum circumferential length such that the protrusion is press-fitted in the recess.

In accordance with a fifth aspect of the present invention, the bicycle hub assembly according to the second aspect is configured so that the sprocket supporting member includes a second tooth radially outwardly protruding from the outer peripheral surface of the tubular portion and made of the first material. The tooth body has a shape substantially equal to a shape of the second tooth in an axial region where the mounting portion of the bicycle sprocket engages with the tooth body and the second tooth.

In accordance with a sixth aspect of the present invention, the bicycle hub assembly according to the third aspect is configured so that the first tooth has a longitudinal axis parallel to the axial direction in a state where the first tooth is attached to the tubular portion via the recess and the protrusion. The tooth body and the protrusion extend along the longitudinal axis.

In accordance with a seventh aspect of the present invention, the bicycle hub assembly according to the sixth aspect is configured so that the tooth body has a first maximum axial length defined along the longitudinal axis. The protrusion has a second maximum axial length defined along the longitudinal axis. The second maximum axial length is shorter than the first maximum axial length.

In accordance with an eighth aspect of the present invention, the bicycle hub assembly according to the second aspect is configured so that the tooth body has a first maximum circumferential length defined in the circumferential direction in a state where the first tooth is attached to the tubular portion via the recess and the protrusion. The protrusion has a second maximum circumferential length defined in the circumferential direction in a state where the first tooth is attached to the tubular portion via the recess and the protrusion. The second maximum circumferential length is shorter than the first maximum circumferential length.

In accordance with a ninth aspect of the present invention, the bicycle hub assembly according to the second aspect is configured so that the tooth body has a first maximum circumferential length defined in the circumferential direction in a state where the first tooth is attached to the tubular portion via the recess and the protrusion. The protrusion has a second maximum circumferential length defined in the circumferential direction in a state where the first tooth is attached to the tubular portion via the recess and the protrusion. The second maximum circumferential length is equal to the first maximum circumferential length.

In accordance with a tenth aspect of the present invention, the bicycle hub assembly according to the second aspect is configured so that the attachment portion includes a first inner surface and a second inner surface spaced apart from the first inner surface in the circumferential direction. The protrusion includes a first circumferential end surface and a second circumferential end surface. The first circumferential end surface is configured to face the first inner surface in the circumferential direction. The second circumferential end surface is configured to face the second inner surface in the circumferential direction.

In accordance with an eleventh aspect of the present invention, the bicycle hub assembly according to the tenth aspect is configured so that the first circumferential end surface of the protrusion is disposed on a plane defined by the first surface of the tooth body. The second circumferential end surface of the protrusion is disposed on a plane defined by the second surface of the tooth body.

In accordance with a twelfth aspect of the present invention, the bicycle hub assembly according to the second aspect is configured so that the tooth body includes an inner peripheral surface facing the outer peripheral surface of the sprocket support member. The attachment portion includes a first inner surface. The protrusion includes a first circumferential end surface configured to face the first inner surface in the circumferential direction. The inner peripheral surface of the tooth body and the first circumferential end surface of the protrusion are positioned on a downstream side of the protrusion in a driving rotational direction of the sprocket support member.

In accordance with a thirteenth aspect of the present invention, the bicycle hub assembly according to the twelfth aspect is configured so that the inner peripheral surface of the tooth body is substantially perpendicular to the first circumferential end surface of the protrusion.

In accordance with a fourteenth aspect of the present invention, the bicycle hub assembly according to the third aspect is configured so that the first tooth has a longitudinal axis parallel to the axial direction in a state where the first tooth is attached to the tubular portion via the attachment portion. The first tooth at least partially has a substantially T-shaped cross-section taken along a plane perpendicular to the longitudinal axis.

In accordance with a fifteenth aspect of the present invention, the bicycle hub assembly according to the third aspect is configured so that the first tooth has a longitudinal axis parallel to the axial direction in a state where the first tooth is attached to the tubular portion via the attachment portion. The first tooth at least partially has a substantially L-shaped cross-section taken along a plane perpendicular to the longitudinal axis.

In accordance with a sixteenth aspect of the present invention, the bicycle hub assembly according to the first aspect is configured so that the attachment portion includes a plurality of recesses provided on the outer peripheral surface of the tubular portion. The first tooth includes a tooth body and a plurality of protrusions. The tooth body includes the first surface and the second surface. The tooth body is configured to be provided on the outer peripheral surface of the tubular portion in a state where the first tooth is attached to the tubular portion via the attachment portion. The plurality of protrusions protrudes from the tooth body and is configured to be respectively disposed in the plurality of recesses.

In accordance with a seventeenth aspect of the present invention, the bicycle hub assembly according to the first aspect further comprises a securing member with which the first tooth is to be secured to the attachment portion.

In accordance with an eighteenth aspect of the present invention, the bicycle hub assembly according to the seventeenth aspect is configured so that the attachment portion includes a threaded hole. The securing member includes an externally threaded part configured to be screwed in the threaded hole.

In accordance with a nineteenth aspect of the present invention, the bicycle hub assembly according to the first aspect is configured so that the first material has a hardness lower than a hardness of the second material.

In accordance with a twentieth aspect of the present invention, the bicycle hub assembly according to the first aspect is configured so that the first material comprises an aluminum alloy. The second material comprises an iron alloy.

In accordance with a twenty-first aspect of the present invention, the bicycle hub assembly according to the first aspect is configured so that the sprocket supporting member includes a second tooth and a third tooth. The second tooth radially outwardly protrudes from the outer peripheral surface of the tubular portion and made of the first material. The third tooth radially outwardly protrudes from the outer peripheral surface of the tubular portion and is made of the first material. The third tooth is spaced apart from the second tooth in the circumferential direction. The attachment portion is provided between the second tooth and the third tooth in the circumferential direction.

In accordance with a twenty-second aspect of the present invention, the bicycle hub assembly according to the twenty-first aspect is configured so that a distance defined between the attachment portion and the second tooth in the circumferential direction is substantially equal to a distance defined between the attachment portion and the third tooth in the circumferential direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 13 is a top view of a first tooth of the sprocket supporting member illustrated in FIG. 11;

FIG. 14 is a side elevational view of the first tooth of the sprocket supporting member illustrated in FIG. 11;

FIG. 15 is a side elevational view of the first tooth of the sprocket supporting member illustrated in FIG. 11;

FIG. 24 is a top view of a first tooth of the sprocket supporting member illustrated in FIG. 22;

FIG. 25 is a side elevational view of the first tooth of the sprocket supporting member illustrated in FIG. 22;

FIG. 26 is a side elevational view of the first tooth of the sprocket supporting member illustrated in FIG. 22;

DESCRIPTION OF THE EMBODIMENTS

Figure 1:
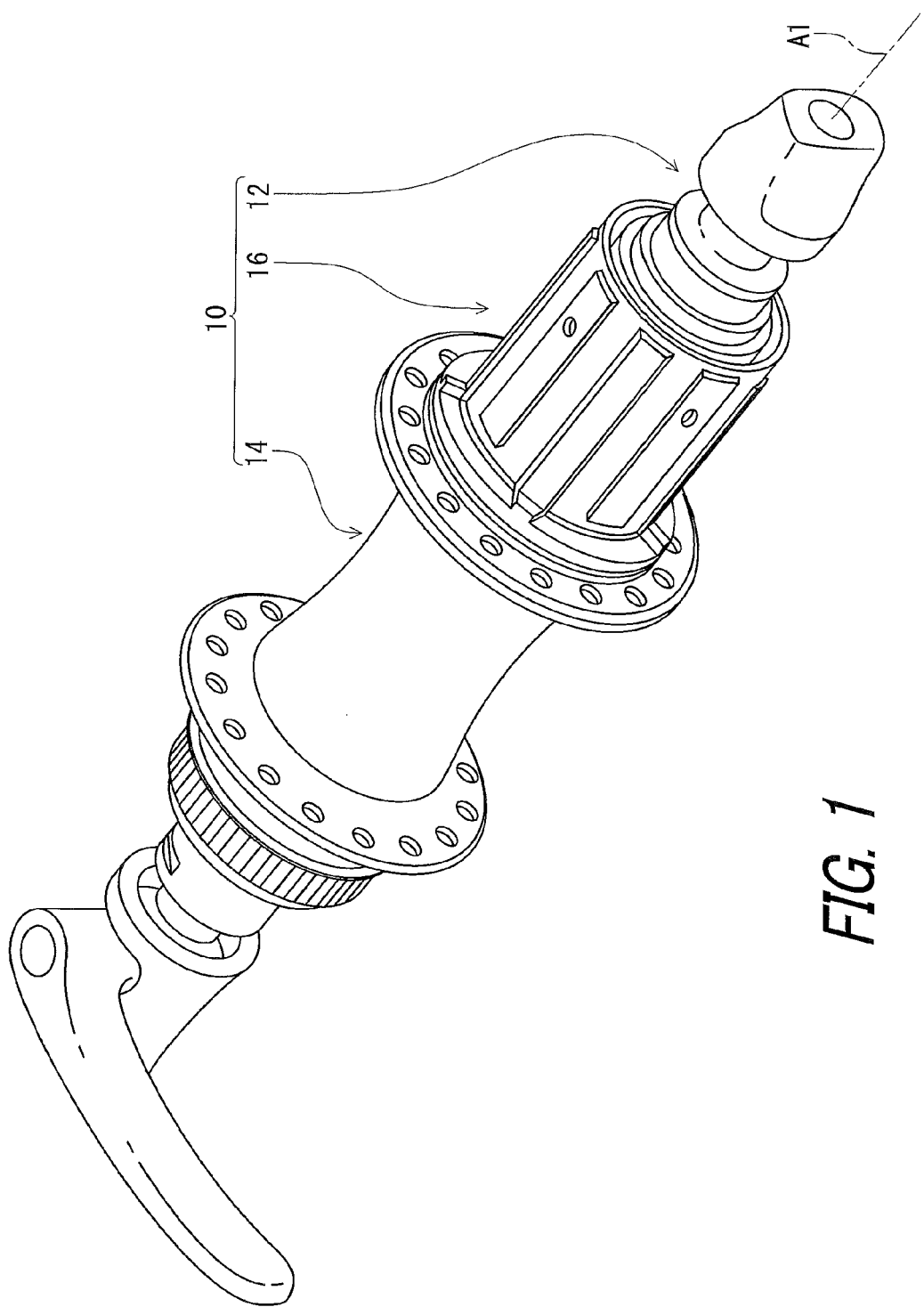
FIG. 1 is a perspective view of a bicycle hub assembly in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle hub assembly in accordance with a first embodiment is illustrated. In the illustrated embodiment, the bicycle hub assembly 10 is a rear hub assembly. The bicycle hub assembly 10 can, however, be a front hub assembly if needed and/or desired.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle (not shown) with facing a handlebar. Accordingly, these terms, as utilized to describe the bicycle hub assembly 10, should be interpreted relative to the bicycle equipped with the bicycle hub assembly 10 as used in an upright riding position on a horizontal surface.

As seen in FIG. 1, the bicycle hub assembly 10 comprises a hub axle 12, a hub shell 14, and a sprocket supporting member 16. The hub shell 14 is rotatable relative to the hub axle 12 about a rotational axis A1. The sprocket supporting member 16 is rotatable relative to the hub axle 12 about the rotational axis A1. In the illustrated embodiment, the sprocket supporting member 16 is a separate member from the hub shell 14 and is coupled to the hub shell 14. The sprocket supporting member 16 can, however, be integrally provided with the hub shell 14 as a single unitary member if needed and/or desired. Since structures other than the sprocket supporting member 16 are well known in the bicycle field, they will not be described and/or illustrated in detail here for the sake of brevity.

Figure 2:
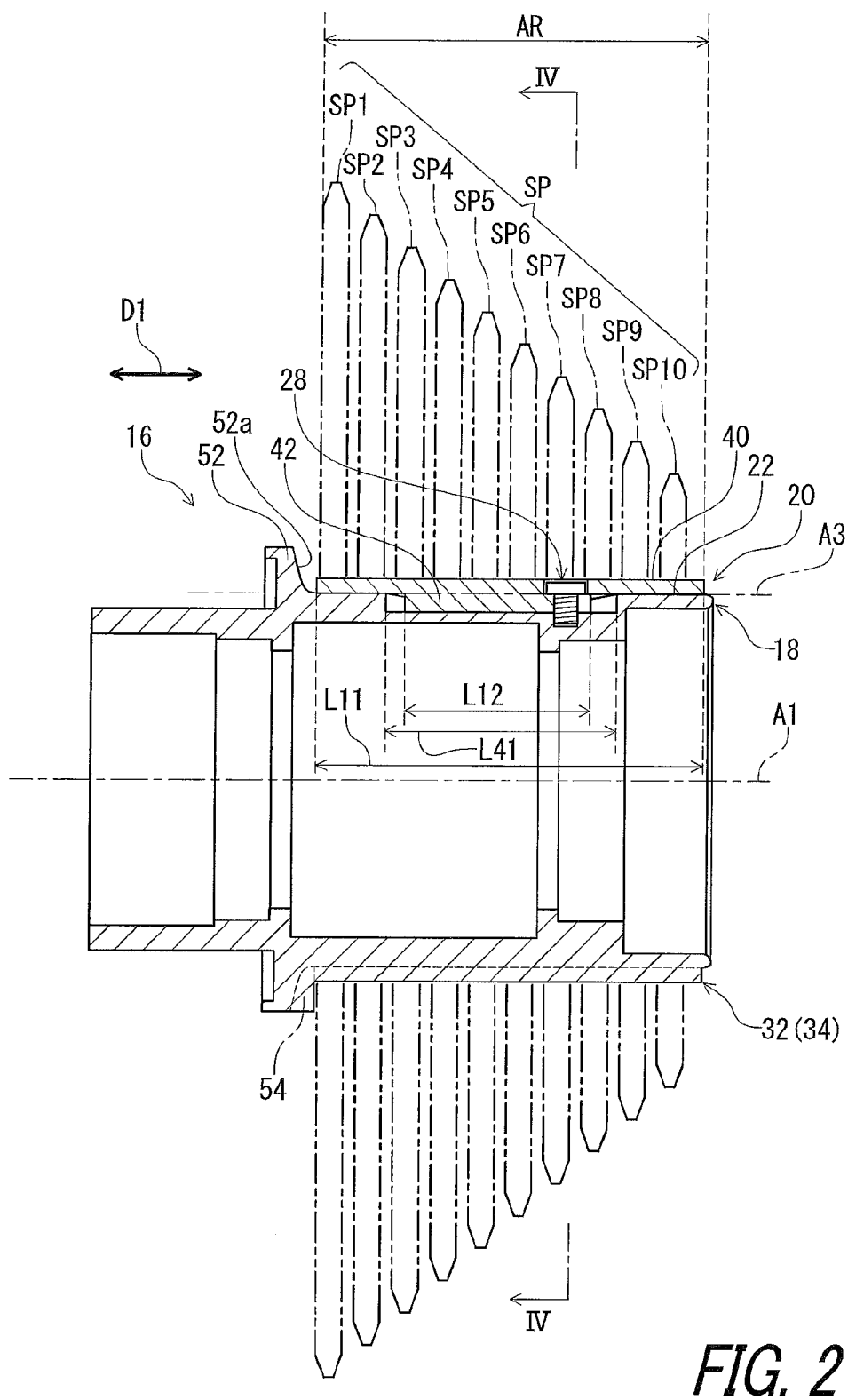
FIG. 2 is a cross-sectional view of a sprocket supporting member of the bicycle hub assembly taken along line II-II of FIG. 4.

FIG. 2 illustrates a cross-section of the sprocket supporting member 16 with the bicycle sprocket SP. As seen in FIG. 2, the sprocket supporting member 16 is configured to support a bicycle sprocket SP to be integrally rotatable with the sprocket supporting member 16 about the rotational axis A1. In the illustrated embodiment, the bicycle sprocket SP is a cassette sprocket including sprockets SP1 to SP10. The sprockets SP1 to SP10 are arranged in an axial direction D1 parallel to the rotational axis A1 in a state where the bicycle sprocket SP is mounted to the sprocket supporting member 16. The sprocket supporting member 16 comprises a tubular portion 18 and a first tooth 20. The tubular portion 18 extends along the rotational axis A1. The bicycle sprocket SP is provided radially outward of the tubular portion 18.

Figure 3:
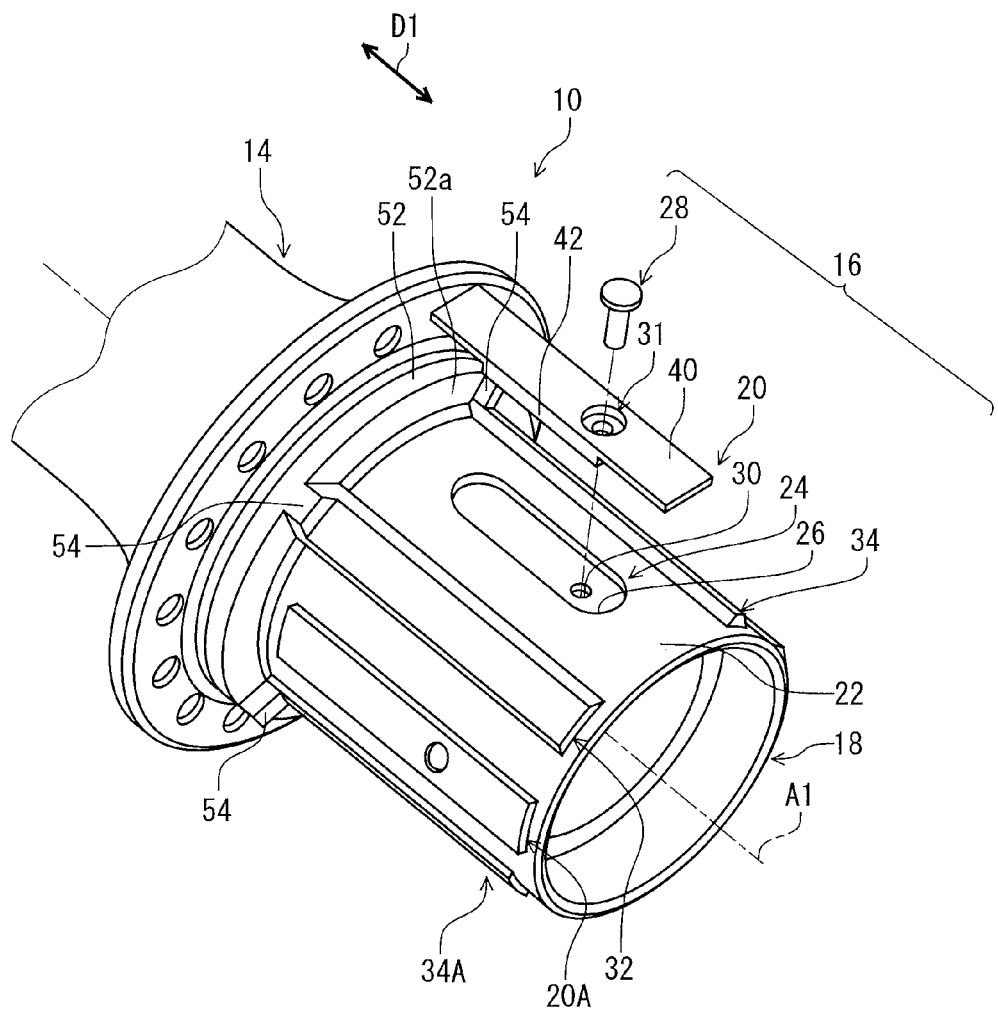
FIG. 3 is a perspective view of the sprocket supporting member illustrated in FIG. 1.

As seen in FIG. 3, the tubular portion 18 includes an outer peripheral surface 22 and an attachment portion 24. The attachment portion 24 is provided only radially inward of the outer peripheral surface 22. In the illustrated embodiment, the attachment portion 24 includes a recess 26 provided on the outer peripheral surface 22 of the tubular portion 18. The recess 26 extends in the axial direction D1 parallel to the rotational axis A1. The first tooth 20 is a separate member from the tubular portion 18. The first tooth 20 is configured to be attached to the attachment portion 24 of the tubular portion 18.

The tubular portion 18 is made of a first material. The first tooth 20 is made of a second material different from the first material. The first material has a hardness lower than a hardness of the second material. The first material comprises an aluminum alloy. The second material comprises an iron alloy. The first material has a density lower than a density of the second material. The first material can, however, have a density equal to or higher than a density of the second material if needed and/or desired.

As seen in FIG. 3, the bicycle hub assembly 10 further comprises a securing member 28 with which the first tooth 20 is to be secured to the attachment portion 24. For example, the securing member 28 is a hexagon socket head cap screw. The attachment portion 24 includes a threaded hole 30. In the illustrated embodiment, the threaded hole 30 is provided in the recess 26. The securing member 28 includes an externally threaded part 28a configured to be screwed in the threaded hole 30. The first tooth 20 includes an attachment through-hole 31 through which the securing member 28 extends.

Figure 4:
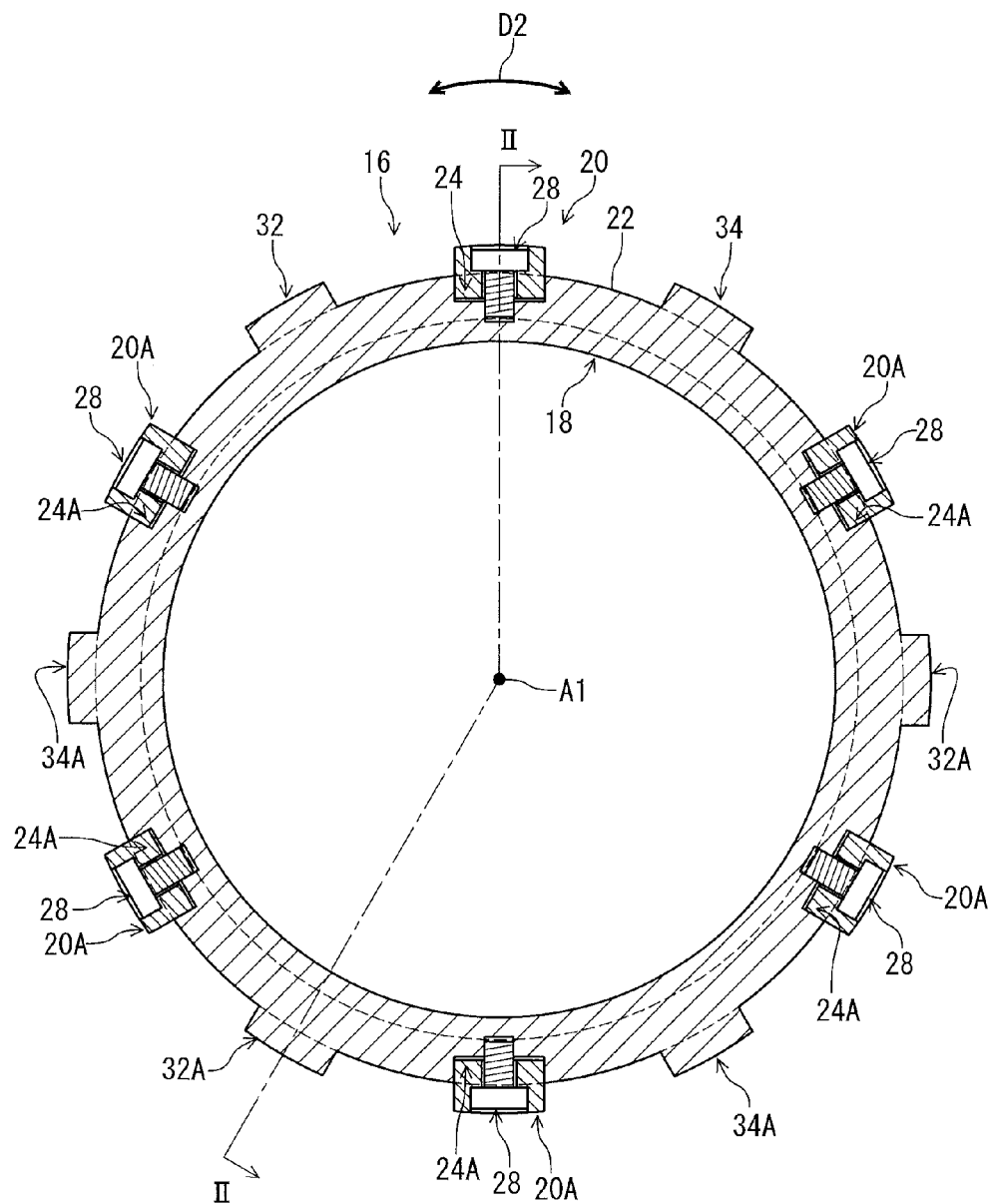
FIG. 4 is a cross-sectional view of the sprocket supporting member taken along line IV-IV of FIG. 2.

As seen in FIG. 4, the sprocket supporting member 16 includes a second tooth 32 and a third tooth 34. The second tooth 32 radially outwardly protrudes from the outer peripheral surface 22 of the tubular portion 18. The second tooth 32 is made of the first material. The third tooth 34 radially outwardly protrudes from the outer peripheral surface 22 of the tubular portion 18. The third tooth 34 is made of the first material. The second tooth 32 and the third tooth 34 are integrally provided with the tubular portion 18 as a single unitary member. The third tooth 34 is spaced apart from the second tooth 32 in a circumferential direction D2 of the sprocket supporting member 16. The attachment portion 24 is provided between the second tooth 32 and the third tooth 34 in the circumferential direction D2.

The sprocket supporting member 16 further includes additional second teeth 32A and additional third teeth 34A. Since each of the additional second teeth 32A has substantially the same shape as the second tooth 32, the additional second teeth 32A can be referred to as the second tooth 32. Since each of the additional third teeth 34A has substantially the same shape as the third tooth 34, the additional third teeth 34A can be referred to as the third tooth 34. They will not be described and/or illustrated in detail here for the sake of brevity.

As seen in FIG. 4, the sprocket supporting member 16 further includes additional first teeth 20A. Since the additional first teeth 20A have the same shape as the first tooth 20, the additional first teeth 20A can be referred to as the first tooth 20. The tubular portion 18 further includes additional attachment portions 24A. Since the additional attachment portions 24A have the same shape as the attachment portion 24, the additional attachment portions 24A can be referred to as the attachment portion 24. The additional second teeth 32A and the additional third teeth 34A are alternatively arranged in the circumferential direction D2 at a constant pitch. Each of the first teeth 20 is provided between the second tooth 32 and the third tooth 34. Each of the attachment portions 24 is provided between the second tooth 32 and the third tooth 34.

A total number of the first teeth 20 is not limited to the illustrated embodiment. For example, the sprocket supporting member 16 can include at least one first tooth 20 if needed and/or desired. All teeth of the sprocket supporting member 16 can be replaced with the first tooth 20 if needed and/or desired.

Figure 5:
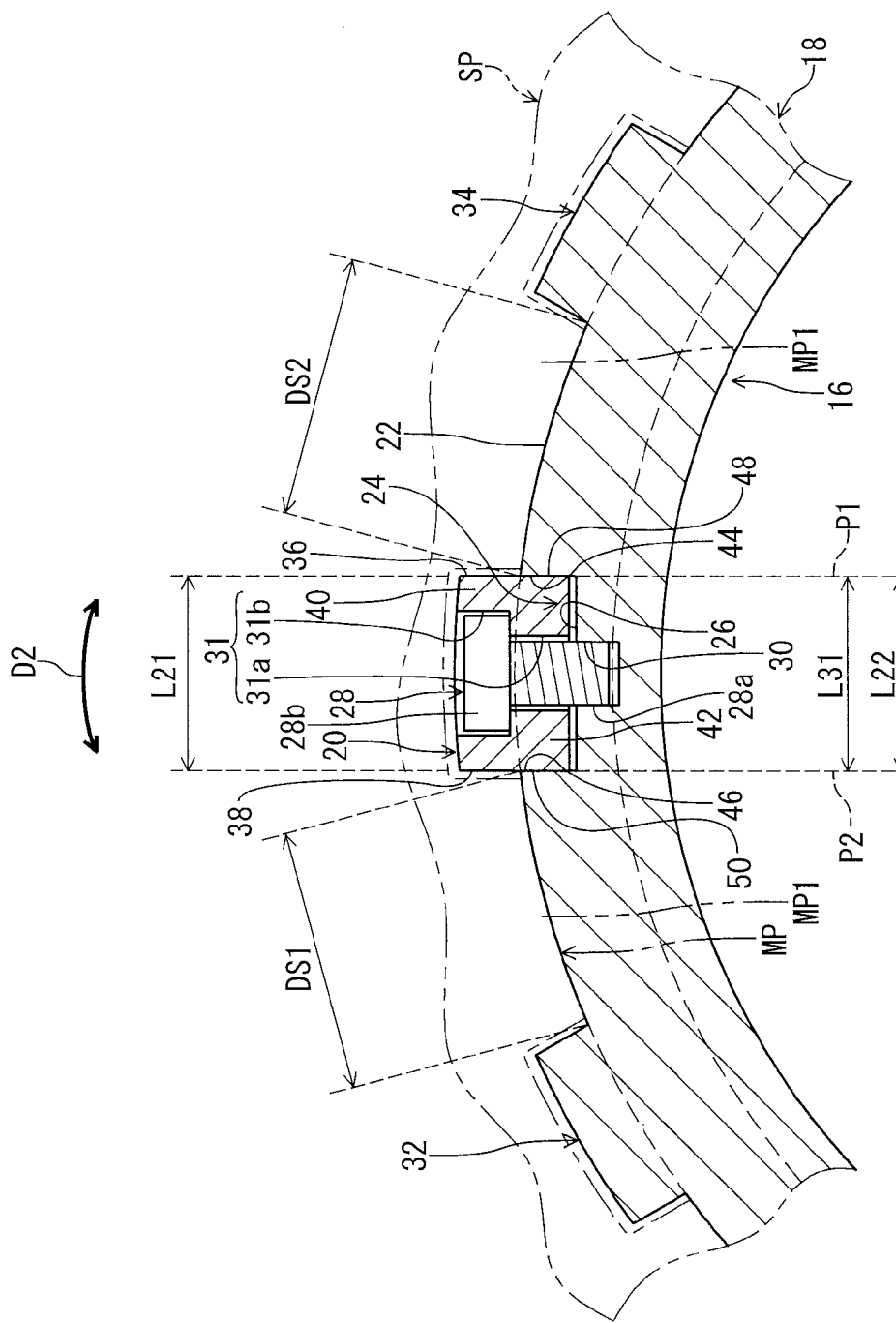
FIG. 5 is a partial enlarged cross-sectional view of the sprocket supporting member illustrated in FIG. 4.

As seen in FIG. 5, a distance DS1 defined between the attachment portion 24 and the second tooth 32 in the circumferential direction D2 is substantially equal to a distance DS2 defined between the attachment portion 24 and the third tooth 34 in the circumferential direction D2. The distance DS1 can, however, be different from the distance DS2 if needed and/or desired. The distance DS1 can be defined between the first tooth 20 and the second tooth 32 in the circumferential direction D2. The distance DS2 can be defined between the first tooth 20 and the third tooth 34 in the circumferential direction D2.

As seen in FIG. 5, the first tooth 20 comprises a first surface 36 and a second surface 38. The first surface 36 is configured to face a mounting portion MP of the bicycle sprocket SP in the circumferential direction D2 of the sprocket supporting member 16. The second surface 38 is opposite to the first surface 36 in the circumferential direction D2. The second surface 38 is configured to face the mounting portion MP of the bicycle sprocket SP in the circumferential direction D2.

In the illustrated embodiment, the mounting portion MP includes mounting teeth MP1 arranged in the circumferential direction D2. The first tooth 20 is disposed between adjacent two of the mounting teeth MP1 in a state where the bicycle sprocket SP is mounted to the sprocket supporting member 16. The first surface 36 is contactable with one of the mounting teeth MP1 in the circumferential direction D2. The second surface 38 is contactable with another of the mounting teeth MP1 in the circumferential direction D2.

As seen in FIG. 5, the attachment through-hole 31 includes a first hole 31a and a second hole 31b. The second hole 31b has an inner diameter larger than an inner diameter of the first hole 31a. The securing member 28 includes a head part 28b provided at an end of the externally threaded part 28a. The head part 28b has an outer diameter larger than an outer diameter of the externally threaded part 28a. The head part 28b is entirely provided in the second hole 31b in a state where the first tooth 20 is secured to the tubular portion 18 by the securing member 28.

Figure 6:
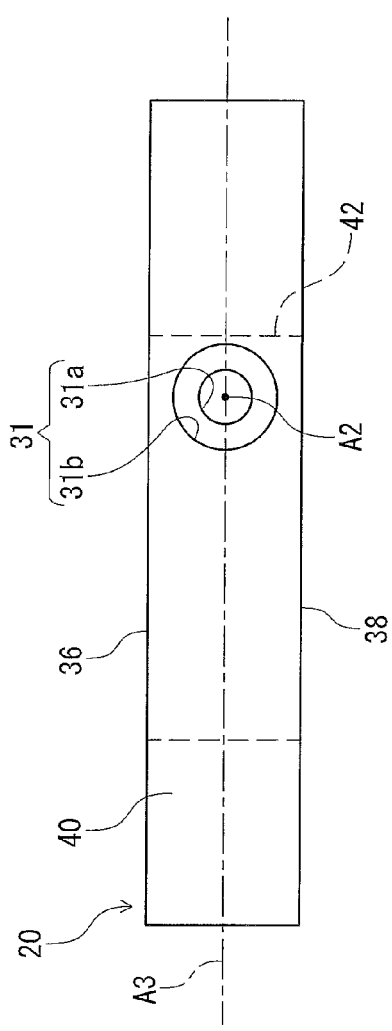
FIG. 6 is a top view of a first tooth of the sprocket supporting member illustrated in FIG. 1.
Figure 7:
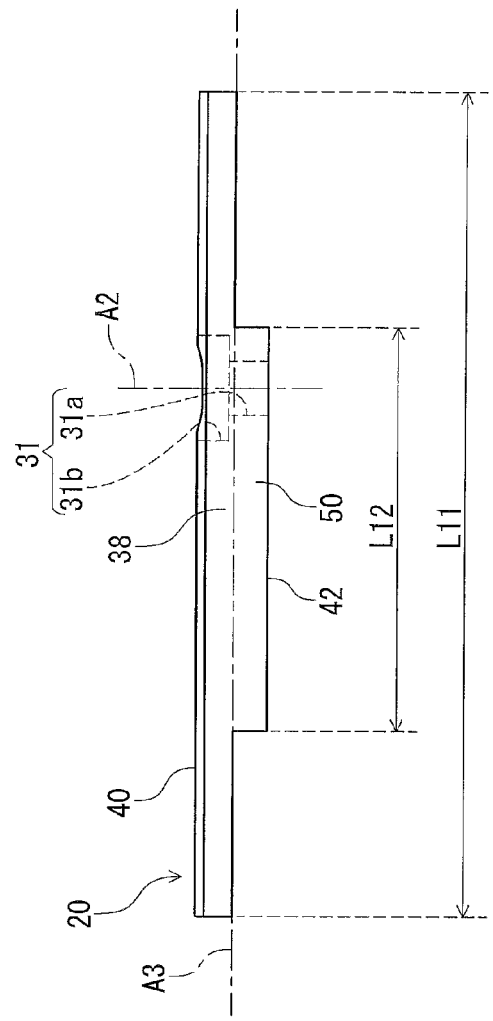
FIG. 7 is a side elevational view of the first tooth of the sprocket supporting member illustrated in FIG. 1.
Figure 8:
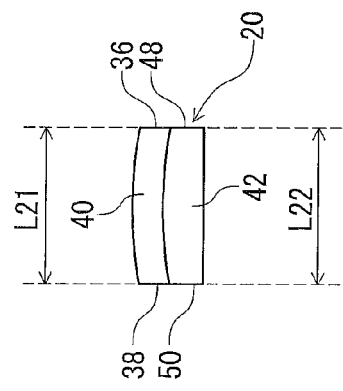
FIG. 8 is a side elevational view of the first tooth of the sprocket supporting member illustrated in FIG. 1.

As seen in FIGS. 5 to 8, the first tooth 20 includes a tooth body 40 and a protrusion 42. The tooth body 40 includes the first surface 36 and the second surface 38. As seen in FIGS. 5 and 8, the tooth body 40 has an arc shape along the outer peripheral surface 22 of the tubular portion 18 (FIG. 5). As seen in FIGS. 5, 7 and 8, the protrusion 42 protrudes from the tooth body 40.

As seen in FIG. 6, the attachment through-hole 31 is provided within the protrusion 42 when viewed from in a direction parallel to a center axis A2 of the attachment through-hole 31. As seen in FIG. 7, the attachment through-hole 31 is provided in the tooth body 40 and the protrusion 42.

As seen in FIGS. 2 and 5, the tooth body 40 is configured to be provided on the outer peripheral surface 22 of the tubular portion 18 in a state where the first tooth 20 is attached to the tubular portion 18 via the attachment portion 24. The tooth body 40 is disposed radially outward of the outer peripheral surface 22 of the tubular portion 18 in a state where the first tooth 20 is attached to the tubular portion 18. The protrusion 42 is configured to be disposed in the recess 26. The protrusion 42 is disposed radially inward of the outer peripheral surface 22 of the tubular portion 18 in a state where the first tooth 20 is attached to the tubular portion 18.

As seen in FIG. 2, the first tooth 20 has a longitudinal axis A3 parallel to the axial direction D1 in a state where the first tooth 20 is attached to the tubular portion 18 via the recess 26 and the protrusion 42.

As seen in FIG. 7, the tooth body 40 and the protrusion 42 extend along the longitudinal axis A3. The tooth body 40 has a first maximum axial length L11 defined along the longitudinal axis A3. The protrusion 42 has a second maximum axial length L12 defined along the longitudinal axis A3. The second maximum axial length L12 is shorter than the first maximum axial length L11. The second maximum axial length L12 can, however, be equal to or greater than the first maximum axial length L11 if needed and/or desired.

As seen in FIG. 2, the recess 26 has a maximum axial length L41 defined along the rotational axis A1. The first maximum axial length L11 is greater than the maximum axial length L41. The second maximum axial length L12 is shorter than the maximum axial length L41. The first maximum axial length L11 can, however, be equal to or shorter than the maximum axial length L41 if needed and/or desired. The second maximum axial length L12 can be equal to the maximum axial length L41 if needed and/or desired. Furthermore, the protrusion 42 can have the second maximum axial length L12 such that the protrusion 42 is press-fitted in the recess 26 if needed and/or desired.

As seen in FIG. 5, the tooth body 40 has a first maximum circumferential length L21 defined in the circumferential direction D2 in a state where the first tooth 20 is attached to the tubular portion 18 via the recess 26 and the protrusion 42. The protrusion 42 has a second maximum circumferential length L22 defined in the circumferential direction D2 in a state where the first tooth 20 is attached to the tubular portion 18 via the recess 26 and the protrusion 42. As seen in FIGS. 5 and 8, the second maximum circumferential length L22 is equal to the first maximum circumferential length L21. The second maximum circumferential length L22 can, however, be different from the first maximum circumferential length L21 if needed and/or desired.

As seen in FIG. 5, the attachment portion 24 includes a first inner surface 44 and a second inner surface 46 spaced apart from the first inner surface 44 in the circumferential direction D2. The protrusion 42 includes a first circumferential end surface 48 and a second circumferential end surface 50. The first circumferential end surface 48 is configured to face the first inner surface 44 in the circumferential direction D2. The second circumferential end surface 50 is configured to face the second inner surface 46 in the circumferential direction D2.

In the illustrated embodiment, the first maximum circumferential length L21 is defined between the first surface 36 and the second surface 38. The second maximum circumferential length L22 is defined between the first circumferential end surface 48 and the second circumferential end surface 50. The first surface 36 is substantially parallel to the second surface 38. The first circumferential end surface 48 is substantially parallel to the second circumferential end surface 50. However, the first surface 36 can be inclined relative to the second surface 38, and the first circumferential end surface 48 can be inclined relative to the second circumferential end surface 50, if needed and/or desired.

In the illustrated embodiment, the first circumferential end surface 48 of the protrusion 42 is disposed on a plane P1 defined by the first surface 36 of the tooth body 40. The second circumferential end surface 50 of the protrusion 42 is disposed on a plane P2 defined by the second surface 38 of the tooth body 40.

As seen in FIG. 5, the recess 26 has a maximum circumferential length L31 substantially equal to or greater than the second maximum circumferential length L22. In the illustrated embodiment, the first circumferential end surface 48 contacts or is contactable with the first inner surface 44 in the circumferential direction D2. The second circumferential end surface 50 contacts or is contactable with the second inner surface 46 in the circumferential direction D2. A gap can be provided between the first circumferential end surface 48 and the first inner surface 44. A gap can be provided between the second circumferential end surface 50 and the second inner surface 46. The first tooth 20 can be bonded to the recess 26 with bonding material such as adhesive in addition to the securing member 28. The recess 26 can have the maximum circumferential length L31 such that the protrusion 42 is press-fitted in the recess 26 if needed and/or desired.

As seen in FIGS. 2 and 5, the tooth body 40 has a shape substantially equal to a shape of the second tooth 32 in an axial region AR where the mounting portion MP of the bicycle sprocket SP engages with the tooth body 40 and the second tooth 32. As seen in FIG. 5, the tooth body 40 has a shape substantially equal to a shape of the third tooth 34 in the axial region AR where the mounting portion MP of the bicycle sprocket SP engages with the tooth body 40 and the third tooth 34. The tooth body 40 can, however, be a shape different from shapes of the second tooth 32 and the third tooth 34 if needed and/or desired.

As seen in FIGS. 2 and 3, the sprocket supporting member 16 includes a flange portion 52 protruding radially outward from the tubular portion 18. The flange portion 52 has an annular shape. The second tooth 32 and the third tooth 34 are coupled to the flange portion 52. The first tooth 20 is spaced apart from the flange portion 52 in the axial direction D1. The sprocket supporting member 16 further includes stoppers 54. The stoppers 54 are provided on the second tooth 32 and the third tooth 34. The stoppers 54 are provided on an inclined surface 52a of the flange portion 52. The stoppers 54 protrude from the second tooth 32 and the third tooth 34. The stoppers 54 protrude from the flange portion 52. As seen in FIG. 2, the stoppers 54 are contactable with the bicycle sprocket SP and define one end of the axial region AR.

The first tooth 20 can be disposed on the outer peripheral surface 22 to contact the flange portion 52 if needed and/or desired. The stopper 54 can be provided on the first tooth 20 if needed and/or desired. Furthermore, the stopper 54 can be provided on the flange portion 52 at a position corresponding to the first tooth 20.

With the bicycle hub assembly 10, since the first tooth 20 is made of a second material different from the first material of the tubular portion 18, the possibility of design of the bicycle hub assembly 10 can be expanded by changing materials of the first tooth 20 and the tubular portion 18. Furthermore, as seen in FIGS. 2 and 5, since the attachment portion 24 is provided only radially inward of the outer peripheral surface 22 of the tubular portion 18, it is possible to simplify the structure of the bicycle hub assembly 10.

Second Embodiment

A bicycle hub assembly 210 in accordance with a second embodiment will be described below referring to FIGS. 9 and 10. The bicycle hub assembly 210 has the same configuration as the bicycle hub assembly 10 except for the sprocket supporting member 16. Thus, elements having substantially the same function as those in the first embodiment will be numbered the same here, and will not be described again in detail here for the sake of brevity.

Figure 9:
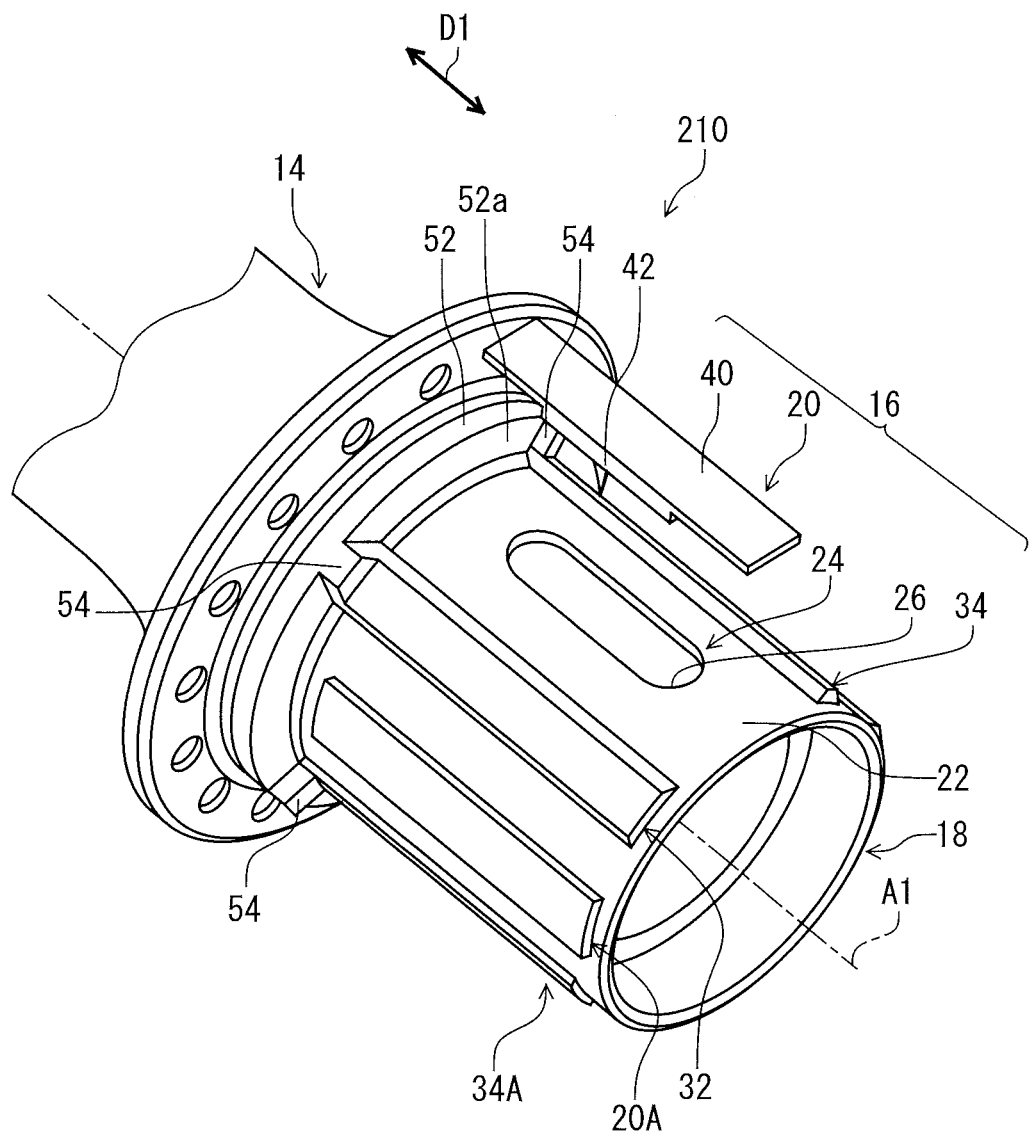
FIG. 9 is a perspective view of a sprocket supporting member of a bicycle hub assembly in accordance with a second embodiment.

As seen in FIG. 9, in the bicycle hub assembly 210, the first tooth 20 is attached to the tubular portion 18 without the securing member 28 (FIG. 3). The threaded hole 30 is omitted from the attachment portion 24. The attachment through-hole 31 is omitted from the first tooth 20. In the bicycle hub assembly 210, the protrusion 42 is press-fitted in the recess 26.

Figure 10:
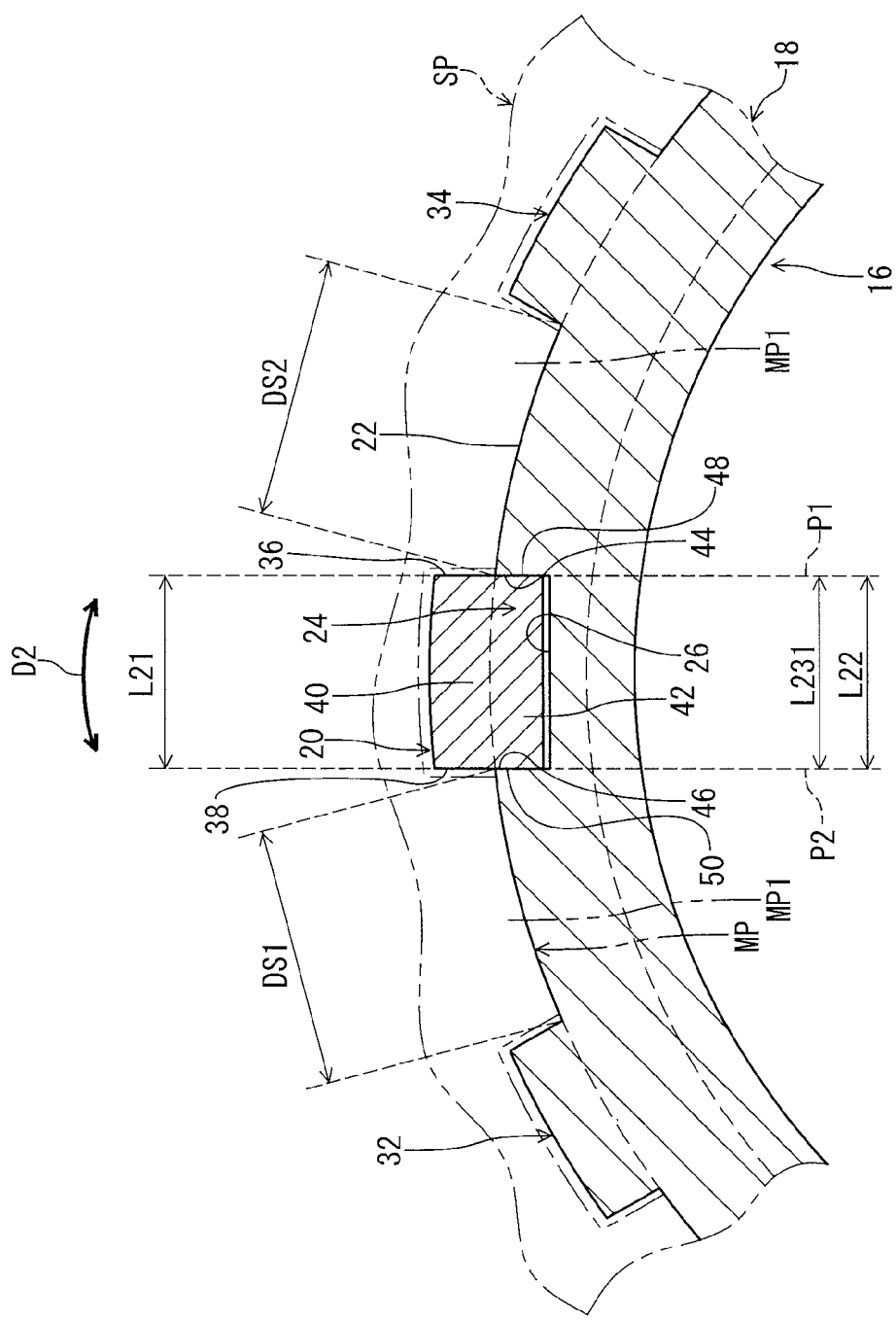
FIG. 10 is a cross-sectional view of the sprocket supporting member illustrated in FIG. 9.

As seen in FIG. 10, the recess 26 has a maximum circumferential length L231 such that the protrusion 42 is press-fitted in the recess 26. More specifically, the second maximum circumferential length L22 of the protrusion 42 is slightly greater than the maximum circumferential length L231 of the recess 26. The first circumferential end surface 48 contacts the first inner surface 44. The second circumferential end surface 50 contacts the second inner surface 46. More specifically, since the protrusion 42 is press-fitted in the recess 26, the first circumferential end surface 48 is pressed against the first inner surface 44, and the second circumferential end surface 50 is pressed against the second inner surface 46. The first tooth 20 can be bonded to the recess 26 with bonding material such as adhesive instead of or in addition to press-fitting.

With the bicycle hub assembly 210, it is possible to obtain the same advantageous effect as the bicycle hub assembly 10 in accordance with the first embodiment.

Third Embodiment

A bicycle hub assembly 310 in accordance with a third embodiment will be described below referring to FIGS. 11 to 15. The bicycle hub assembly 310 has the same configuration as the bicycle hub assembly 10 except for the sprocket supporting member 16. Thus, elements having substantially the same function as those in the above embodiments will be numbered the same here, and will not be described again in detail here for the sake of brevity.

Figure 11:
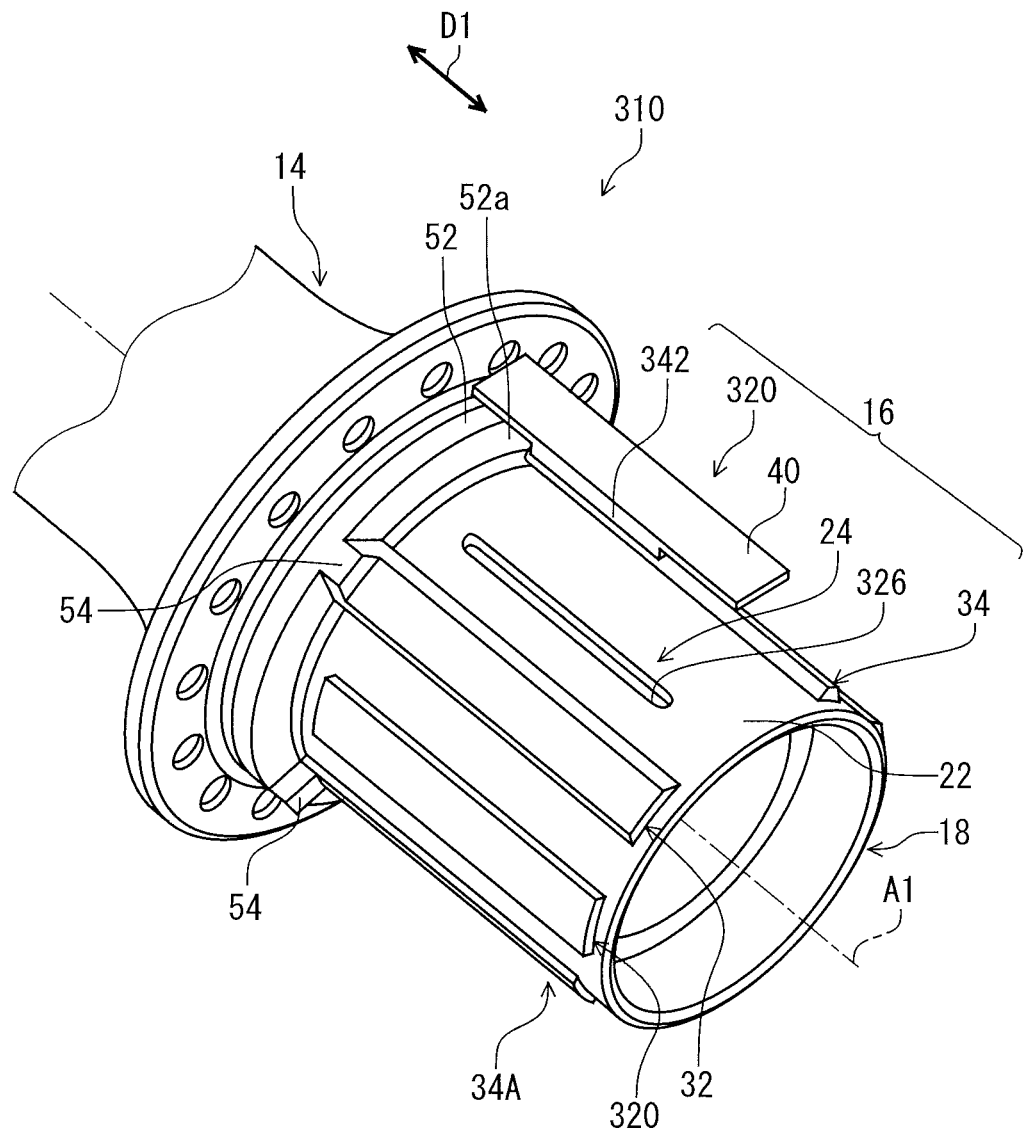
FIG. 11 is a perspective view of a sprocket supporting member of a bicycle hub assembly in accordance with a third embodiment.

As seen in FIG. 11, in the bicycle hub assembly 310, the sprocket supporting member 16 comprises a first tooth 320 configured to be attached to the attachment portion 24 of the tubular portion 18. The first tooth 320 is made of the second material different from the first material. The attachment portion 24 includes a recess 326 provided on the outer peripheral surface 22 of the tubular portion 18.

Figure 12:
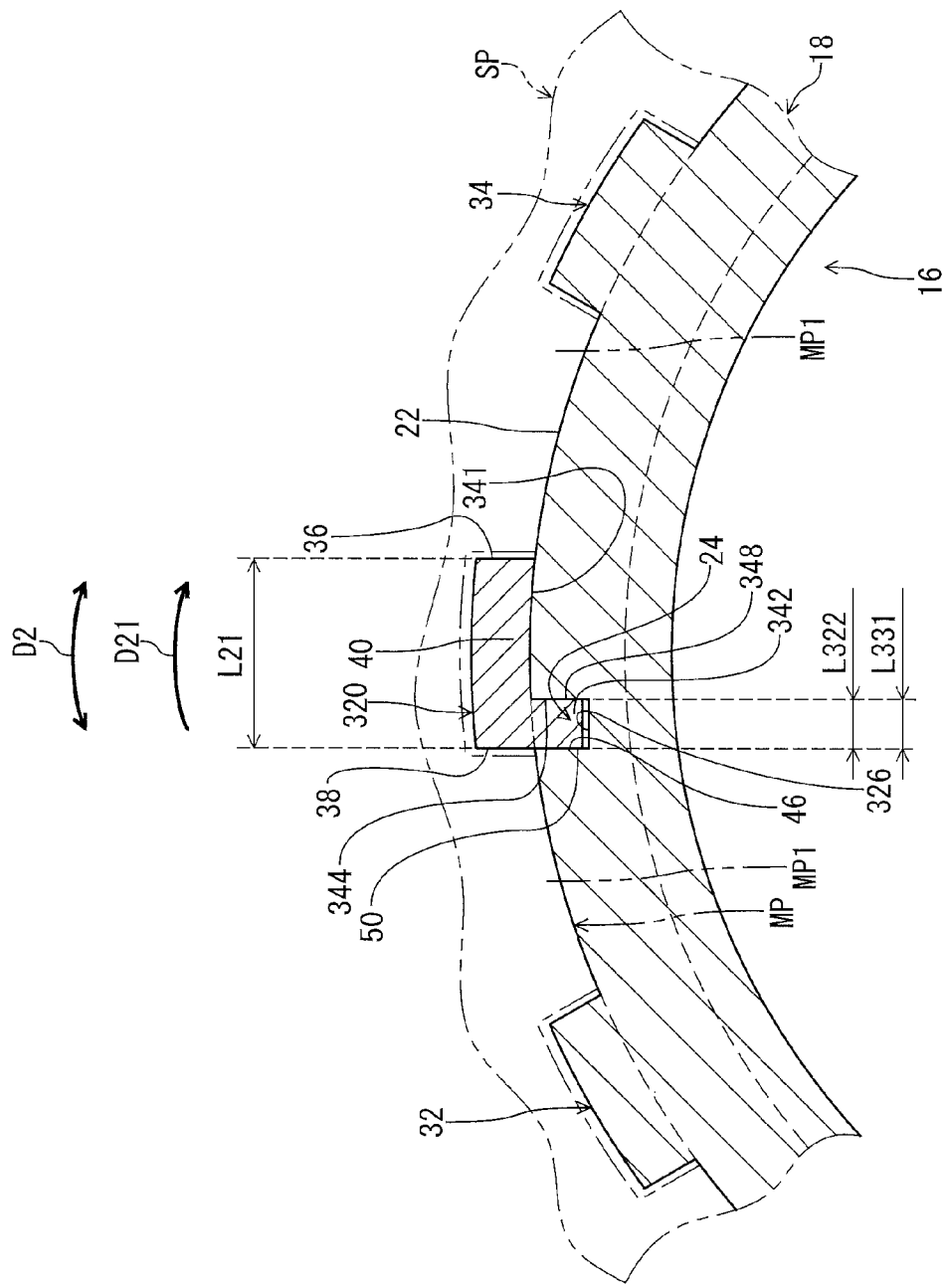
FIG. 12 is a cross-sectional view of the sprocket supporting member illustrated in FIG. 11.

As seen in FIG. 12, the first tooth 320 comprises the tooth body 40 and a protrusion 342. The protrusion 342 protrudes from the tooth body 40 and is configured to be disposed in the recess 326. In the bicycle hub assembly 310, the protrusion 342 is press-fitted in the recess 326.

As seen in FIGS. 13 to 15, the protrusion 342 has a second maximum circumferential length L322 defined in the circumferential direction D2 in a state where the first tooth 320 is attached to the tubular portion 18 via the recess 326 and the protrusion 342. The second maximum circumferential length L322 is shorter than the first maximum circumferential length L21.

As seen in FIG. 12, the recess 326 has a maximum circumferential length L331 such that the protrusion 342 is press-fitted in the recess 326. The second maximum circumferential length L322 is slightly greater than the maximum circumferential length L331.

As seen in FIGS. 12 and 15, the first tooth 320 at least partially has a substantially L-shaped cross-section taken along a plane perpendicular to the longitudinal axis A3. As seen in FIG. 12, the tooth body 40 includes an inner peripheral surface 341 facing the outer peripheral surface 22 of the sprocket support member 16. In the illustrated embodiment, the inner peripheral surface 341 contacts the outer peripheral surface 22 of the sprocket support member 16 in a state where the first tooth 320 is attached to the tubular portion 18. The inner peripheral surface 341 can be bonded to the outer peripheral surface 22 of the sprocket support member 16 with bonding material such as adhesive. The attachment portion 24 includes a first inner surface 344. The protrusion 342 includes a first circumferential end surface 348 configured to face the first inner surface 344 in the circumferential direction D2. In the illustrated embodiment, the first circumferential end surface 348 contacts the first inner surface 344. The second circumferential end surface 50 contacts the second inner surface 46. More specifically, since the protrusion 342 is press-fitted in the recess 326, the first circumferential end surface 348 is pressed against the first inner surface 344, and the second circumferential end surface 50 is pressed against the second inner surface 46. The first tooth 320 can be bonded to the recess 326 with bonding material such as adhesive instead of or in addition to press-fitting.

As seen in FIG. 12, the inner peripheral surface 341 of the tooth body 40 and the first circumferential end surface 348 of the protrusion 342 are positioned on a downstream side of the protrusion 342 in a driving rotational direction D21 of the sprocket support member 16. The inner peripheral surface 341 of the tooth body 40 is substantially perpendicular to the first circumferential end surface 348 of the protrusion 342. The driving rotational direction D21 is defined as a direction in which the sprocket supporting member 16 rotates during pedaling. The driving rotational direction D21 corresponds to one direction of the circumferential direction D2.

With the bicycle hub assembly 310, it is possible to obtain the same advantageous effect as the bicycle hub assembly 10 in accordance with the first embodiment.

Fourth Embodiment

A bicycle hub assembly 410 in accordance with a fourth embodiment will be described below referring to FIGS. 16 to 21. The bicycle hub assembly 410 has the same configuration as the bicycle hub assembly 10 except for the sprocket supporting member 16. Thus, elements having substantially the same function as those in the above embodiments will be numbered the same here, and will not be described again in detail here for the sake of brevity.

Figure 16:
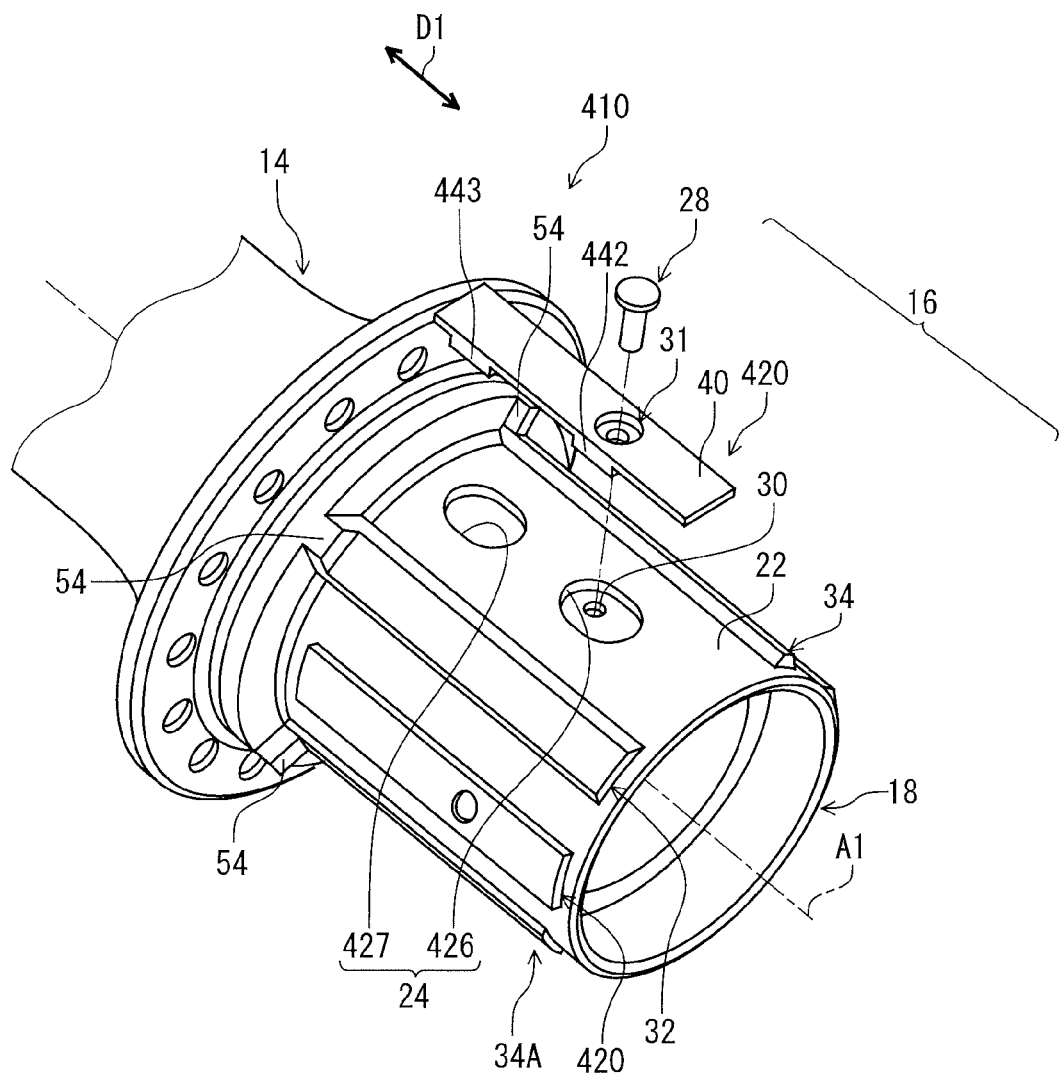
FIG. 16 is a perspective view of a sprocket supporting member of a bicycle hub assembly in accordance with a fourth embodiment.

As seen in FIG. 16, in the bicycle hub assembly 410, the sprocket supporting member 16 comprises the tubular portion 18 and a first tooth 420. The first tooth 420 is configured to be attached to the attachment portion 24 of the tubular portion 18. The first tooth 420 is made of the second material different from the first material. The attachment portion 24 includes a plurality of recesses 426 and 427 provided on the outer peripheral surface 22 of the tubular portion 18. The first tooth 420 includes the tooth body 40 and a plurality of protrusions 442 and 443. The plurality of protrusions 442 and 443 protrudes from the tooth body 40.

The recesses 426 and 427 are spaced apart from each other in the axial direction D1. The protrusions 442 and 443 are spaced apart from each other in the axial direction D1. The number of recesses is not limited to the illustrated embodiment. The number of protrusions is not limited to the illustrated embodiment. The first tooth 420 is secured to the tubular portion 18 by the securing member 28.

Figure 17:
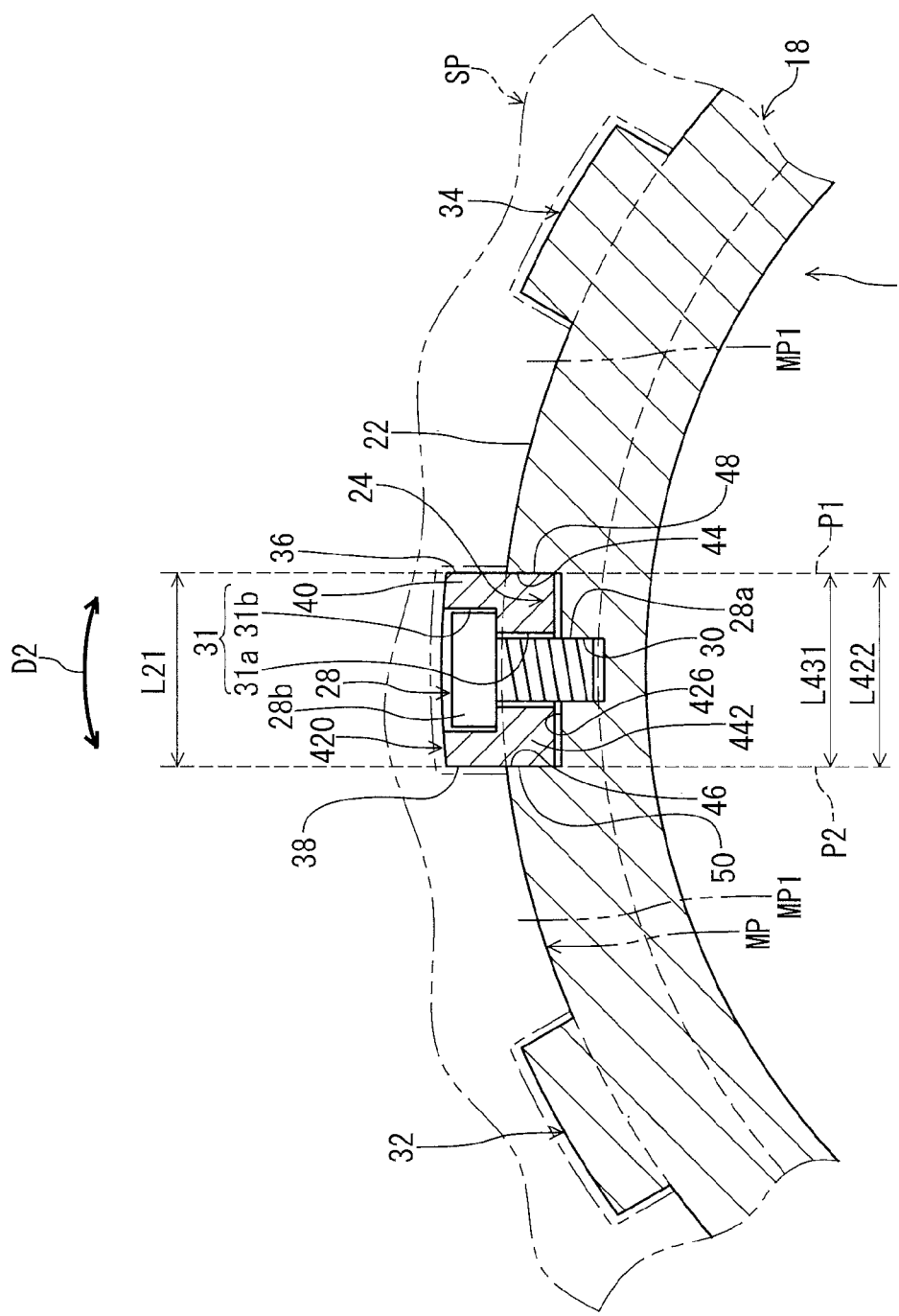
FIG. 17 is a cross-sectional view of the sprocket supporting member illustrated in FIG. 16.
Figure 18:
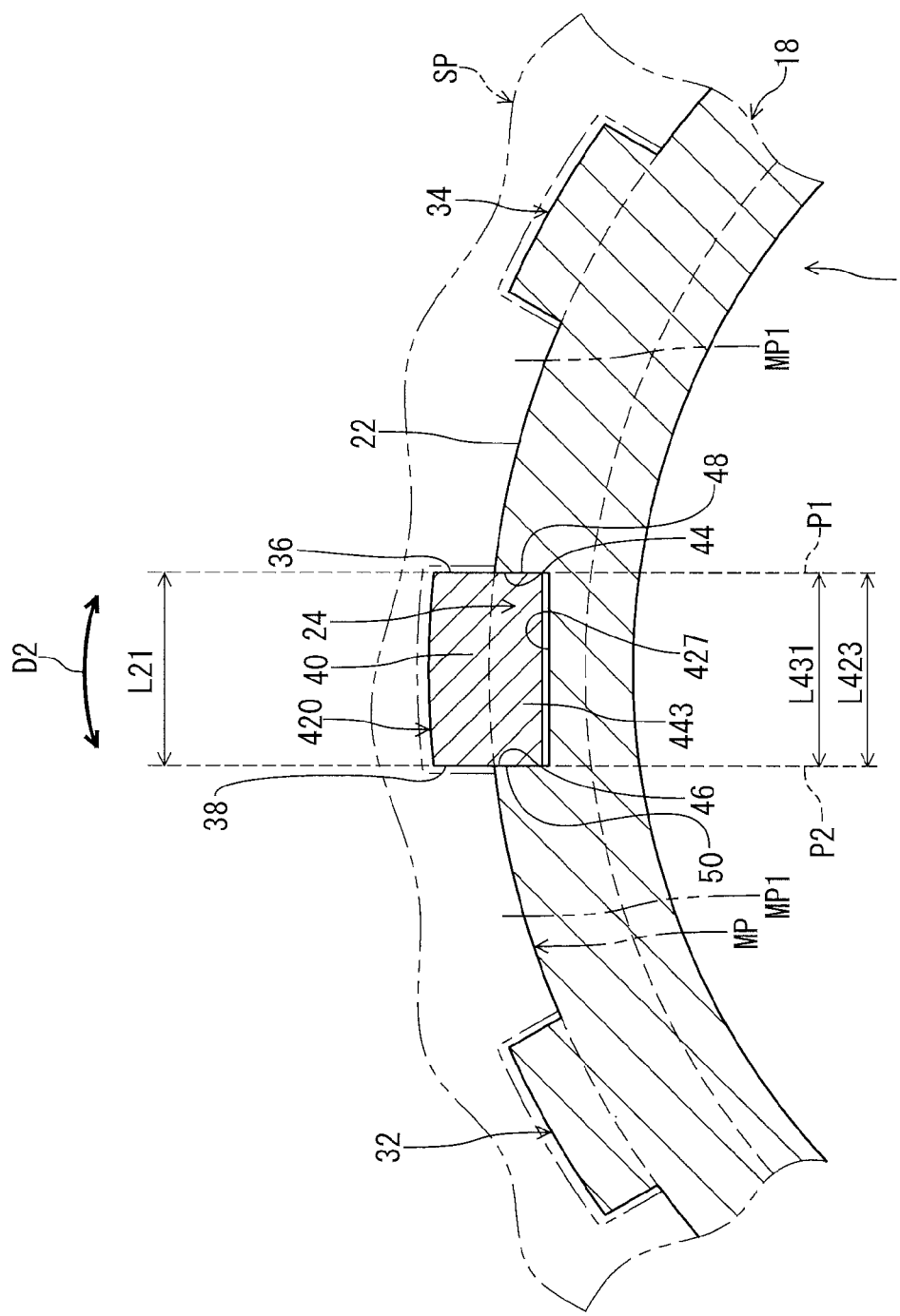
FIG. 18 is a cross-sectional view of the sprocket supporting member illustrated in FIG. 16.

As seen in FIGS. 17 and 18, the protrusions 442 and 443 are configured to be respectively disposed in the plurality of recesses 426 and 427. The first tooth 420 is secured to the tubular portion 18 by the securing member 28 in a state where the protrusions 442 and 443 are disposed in the recesses 426 and 427. Each of the recesses 426 and 427 includes the first inner surface 44 and the second inner surface 46. Each of the protrusions 442 and 443 includes the first circumferential end surface 48 and the second circumferential end surface 50.

Figure 19:
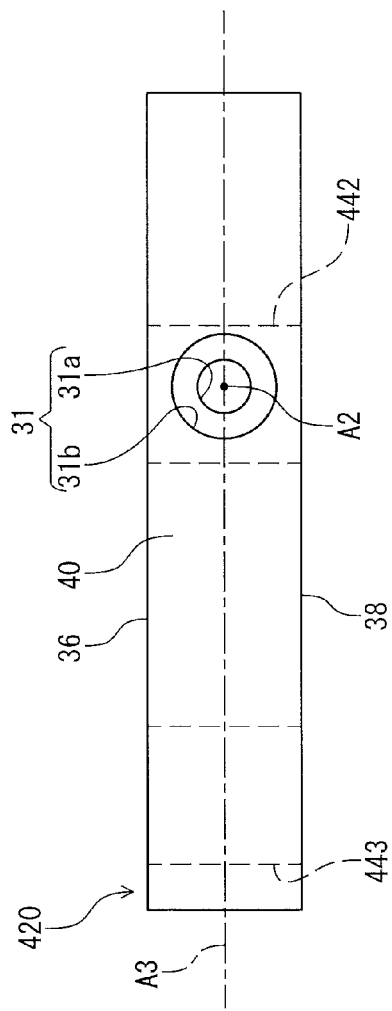
FIG. 19 is a top view of a first tooth of the sprocket supporting member illustrated in FIG. 16.
Figure 20:
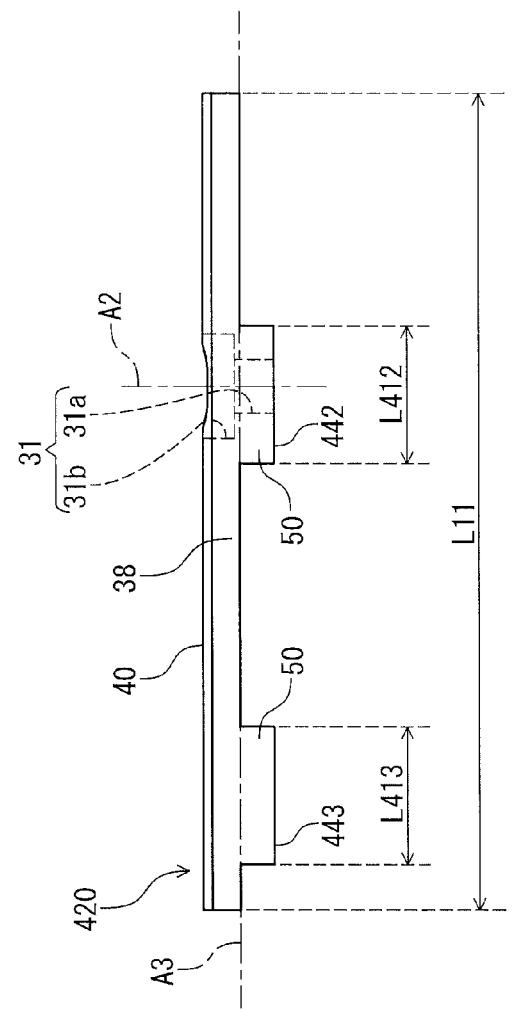
FIG. 20 is a side elevational view of the first tooth of the sprocket supporting member illustrated in FIG. 16.

As seen in FIG. 19, the attachment through-hole 31 is provided within the protrusion 442 when viewed from a direction parallel to the center axis A2 of the attachment through-hole 31. As seen in FIG. 20, the attachment through-hole 31 is provided in the tooth body 40 and the protrusion 442.

As seen in FIG. 20, the protrusions 442 and 443 have second maximum axial lengths L412 and L413 defined along the longitudinal axis A3. Each of the second maximum axial lengths L412 and L413 is shorter than the first maximum axial length L11. In the illustrated embodiment, the second maximum axial length L412 is equal to the second maximum axial length L413. The second maximum axial length L412 can, however, be different from the second maximum axial length L413.

Figure 21:
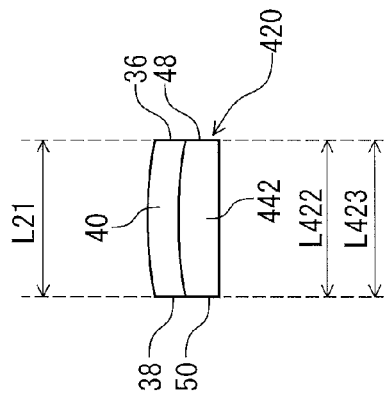
FIG. 21 is a side elevational view of the first tooth of the sprocket supporting member illustrated in FIG. 16.

As seen in FIGS. 17 and 18, the protrusions 442 and 443 have second maximum circumferential lengths L422 and L423 defined in the circumferential direction D2 in a state where the first tooth 420 is attached to the tubular portion 18 via the recesses 426 and 427 and the protrusions 442 and 443. As seen in FIGS. 17, 18 and 21, each of the second maximum circumferential lengths L422 and L423 is equal to the first maximum circumferential length L21. At least one of the second maximum circumferential lengths L422 and L423 can, however, be different from the first maximum circumferential length L21.

With the bicycle hub assembly 410, it is possible to obtain the same advantageous effect as the bicycle hub assembly 10 in accordance with the first embodiment.

Fifth Embodiment

A bicycle hub assembly 510 in accordance with a fifth embodiment will be described below referring to FIGS. 22 to 25. The bicycle hub assembly 510 has the same configuration as the bicycle hub assembly 10 except for the sprocket supporting member 16. Thus, elements having substantially the same function as those in the above embodiments will be numbered the same here, and will not be described again in detail here for the sake of brevity.

Figure 22:
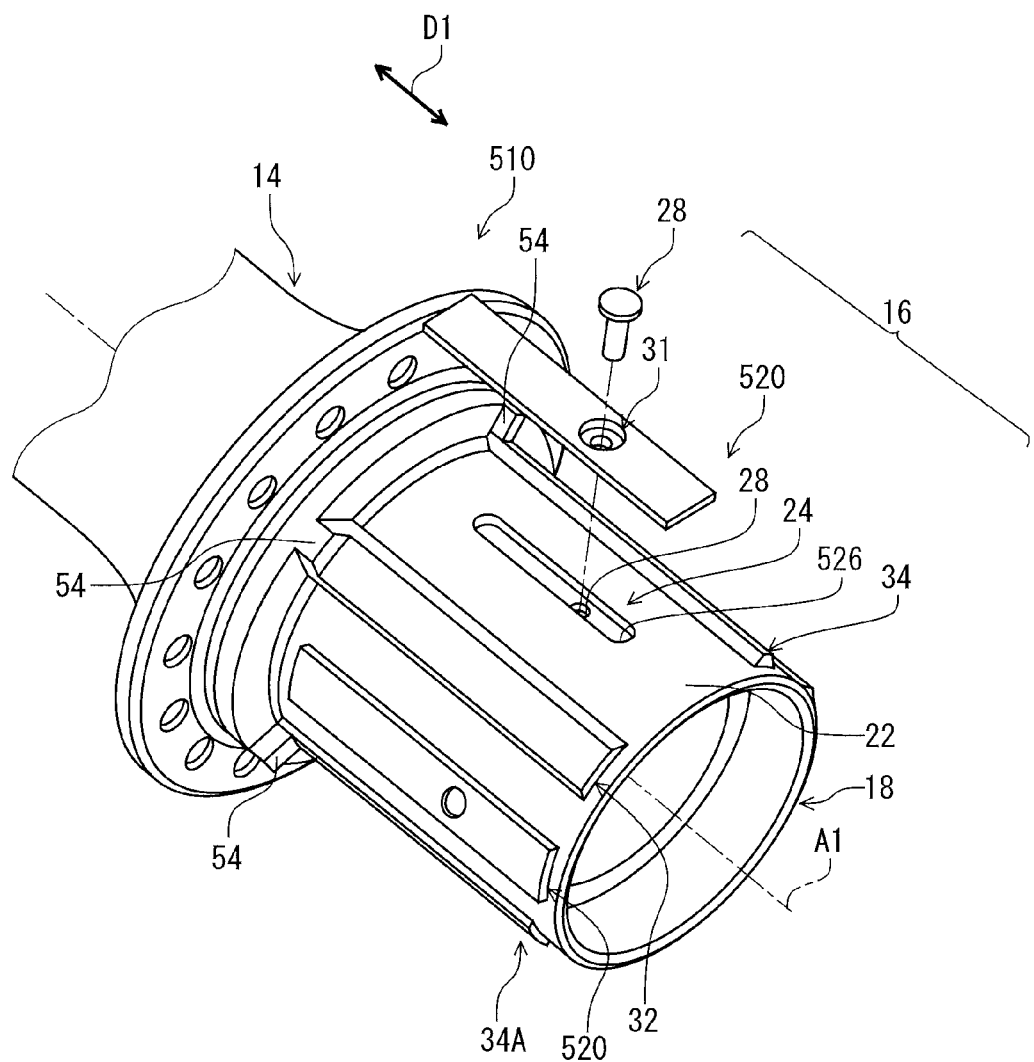
FIG. 22 is a perspective view of a sprocket supporting member of a bicycle hub assembly in accordance with a fifth embodiment.

As seen in FIG. 22, in the bicycle hub assembly 510, the sprocket supporting member 16 comprises a first tooth 520 configured to be attached to the attachment portion 24 of the tubular portion 18. The first tooth 520 is made of the second material different from the first material. The attachment portion 24 includes a recess 526 provided on the outer peripheral surface 22 of the tubular portion 18.

Figure 23:
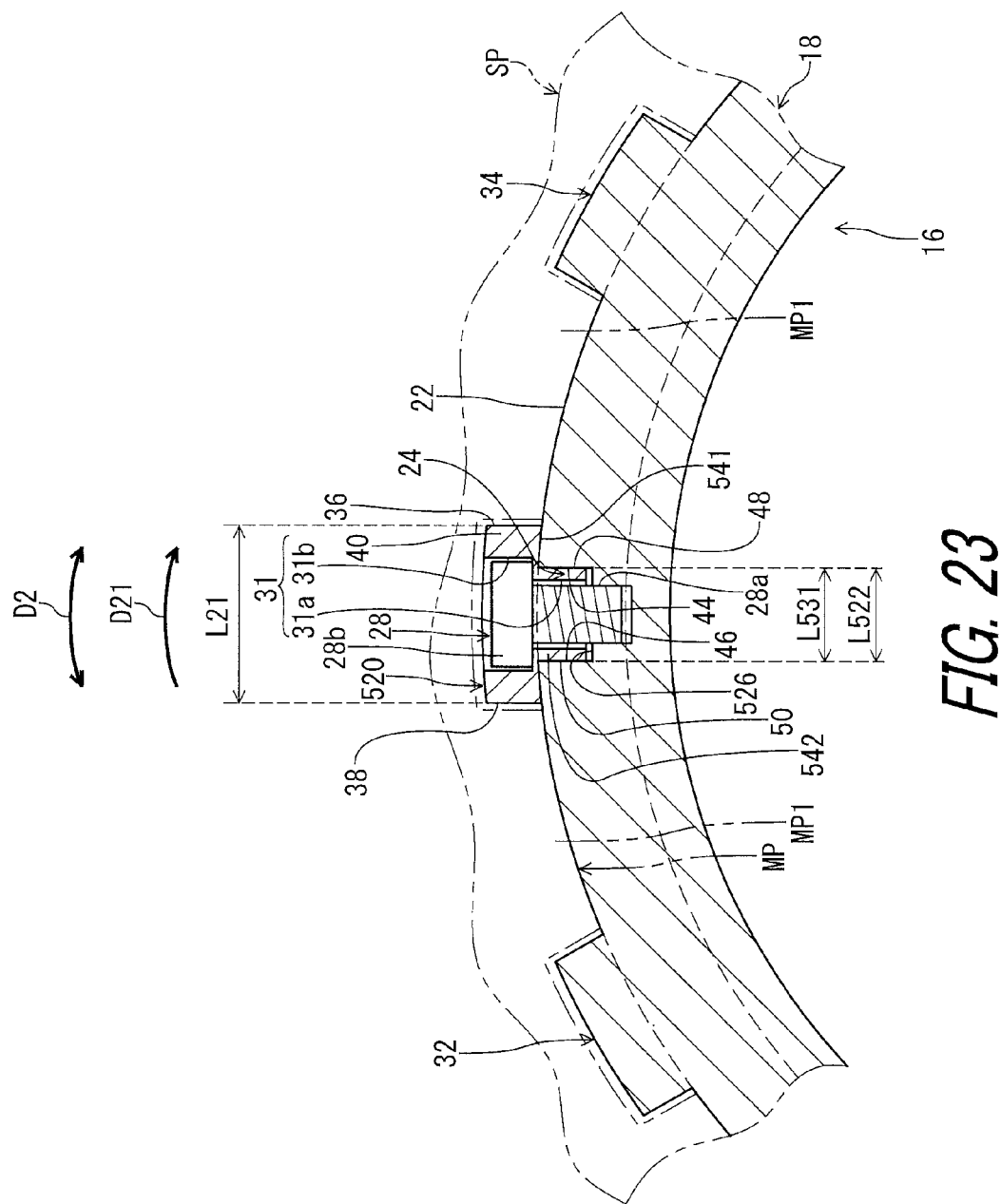
FIG. 23 is a cross-sectional view of the sprocket supporting member illustrated in FIG. 22.

As seen in FIG. 23, the first tooth 520 comprises the tooth body 40 and a protrusion 542. The protrusion 542 protrudes from the tooth body 40 and is configured to be disposed in the recess 526. The protrusion 542 has a second maximum circumferential length L522 defined in the circumferential direction D2 in a state where the first tooth 520 is attached to the tubular portion 18 via the recess 526 and the protrusion 542. The second maximum circumferential length L522 is shorter than the first maximum circumferential length L21.

As seen in FIGS. 23 and 26, the first tooth 520 at least partially has a substantially T-shaped cross-section taken along a plane perpendicular to the longitudinal axis A3. The tooth body 40 includes an inner peripheral surface 541 facing the outer peripheral surface 22 of the sprocket support member 16. In the illustrated embodiment, the inner peripheral surface 541 contacts the outer peripheral surface 22 of the sprocket support member 16 in a state where the first tooth 520 is attached to the tubular portion 18. The inner peripheral surface 541 can be bonded to the outer peripheral surface 22 of the sprocket support member 16 with bonding material such as adhesive if needed and/or desired.

As seen in FIG. 23, the recess 526 has a maximum circumferential length L531 is substantially equal to or greater than the second maximum circumferential length L522. The first tooth 520 can be bonded to the recess 526 with bonding material such as adhesive in addition to the securing member 28. The recess 526 can have the maximum circumferential length L31 such that the protrusion 542 is press-fitted in the recess 526 if needed and/or desired.

As seen in FIG. 24, the attachment through-hole 31 is provided within the protrusion 542 when viewed from a direction parallel to the center axis A2 of the attachment through-hole 31. As seen in FIG. 25, the attachment through-hole 31 is provided in the tooth body 40 and the protrusion 542.

As seen in FIG. 23, the inner peripheral surface 541 of the tooth body 40 and the first circumferential end surface 48 of the protrusion 542 are positioned on a downstream side of the protrusion 542 with respect to the driving rotational direction D21 of the sprocket support member 16. The inner peripheral surface 541 of the tooth body 40 is substantially perpendicular to the first circumferential end surface 48 of the protrusion 542.

With the bicycle hub assembly 510, it is possible to obtain the same advantageous effect as the bicycle hub assembly 10 in accordance with the first embodiment.

Sixth Embodiment

A bicycle hub assembly 610 in accordance with a sixth embodiment will be described below referring to FIGS. 27 and 28. The bicycle hub assembly 610 has the same configuration as the bicycle hub assembly 10 except for the sprocket supporting member 16. Thus, elements having substantially the same function as those in the above embodiments will be numbered the same here, and will not be described again in detail here for the sake of brevity.

Figure 27:
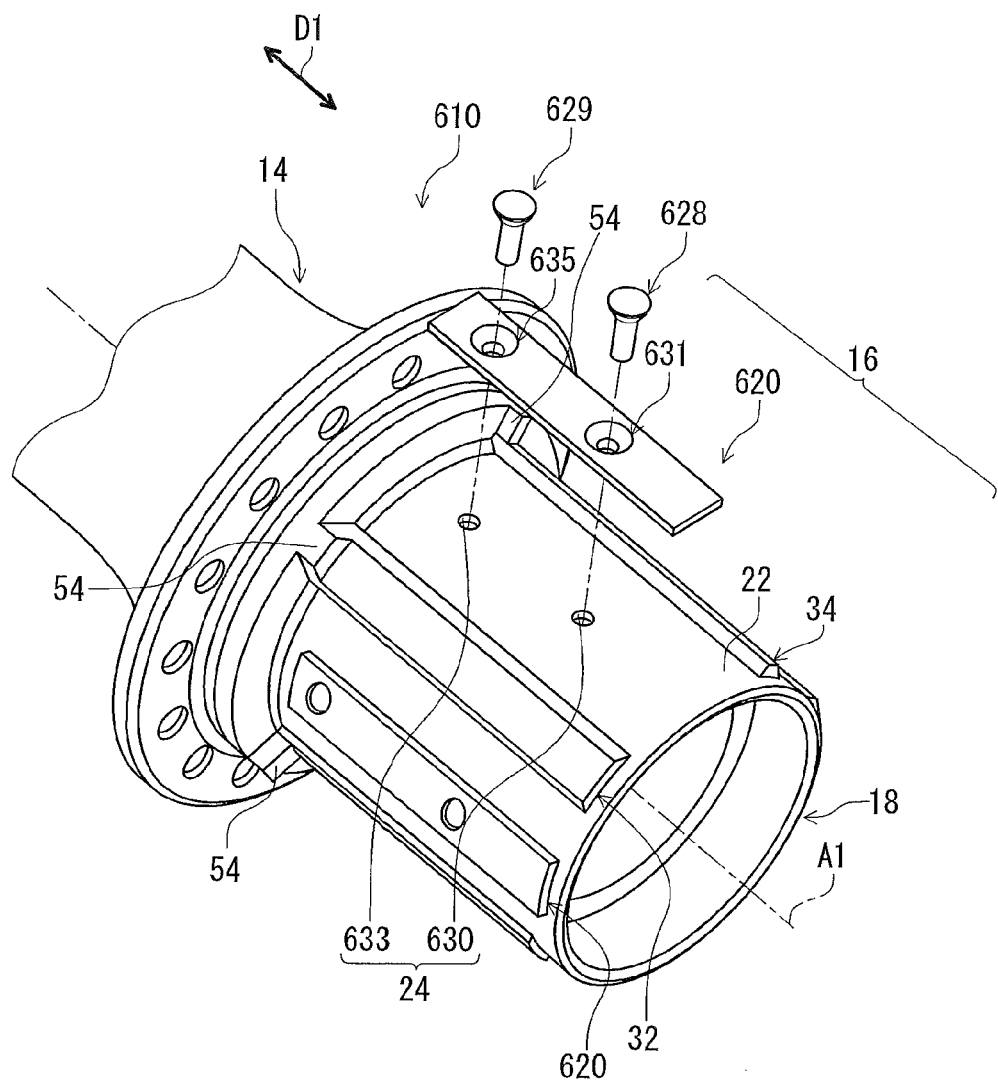
FIG. 27 is a perspective view of a sprocket supporting member of a bicycle hub assembly in accordance with a sixth embodiment.

As seen in FIG. 27, in the bicycle hub assembly 610, the sprocket supporting member 16 comprises a first tooth 620 configured to be attached to the attachment portion 24 of the tubular portion 18. The first tooth 620 is made of the second material different from the first material. The bicycle hub assembly 610 comprises a securing member 628 with which the first tooth 620 is to be secured to the attachment portion 24. The attachment portion 24 includes a threaded hole 630. Furthermore, the bicycle hub assembly 610 comprises a securing member 629 with which the first tooth 620 is to be secured to the attachment portion 24. The attachment portion 24 includes a threaded hole 633. In the illustrated embodiment, the securing member 629 has substantially the same shape as that of the securing member 628. The threaded hole 633 has substantially the same shape as that of the threaded hole 630.

Figure 28A:
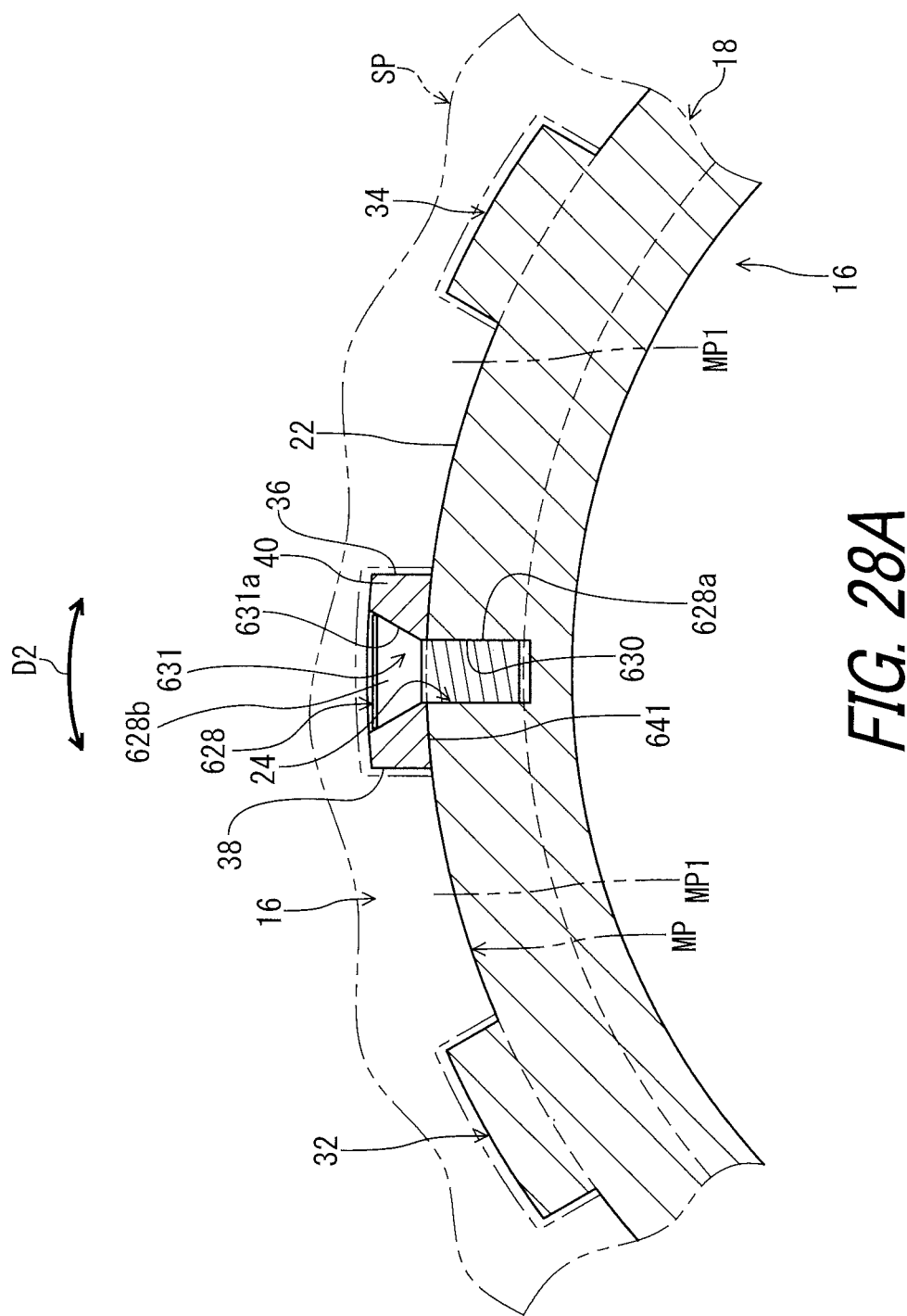
FIG. 28A is a cross-sectional view of the sprocket supporting member illustrated in FIG. 27 taken through securing member 628.
Figure 28B:
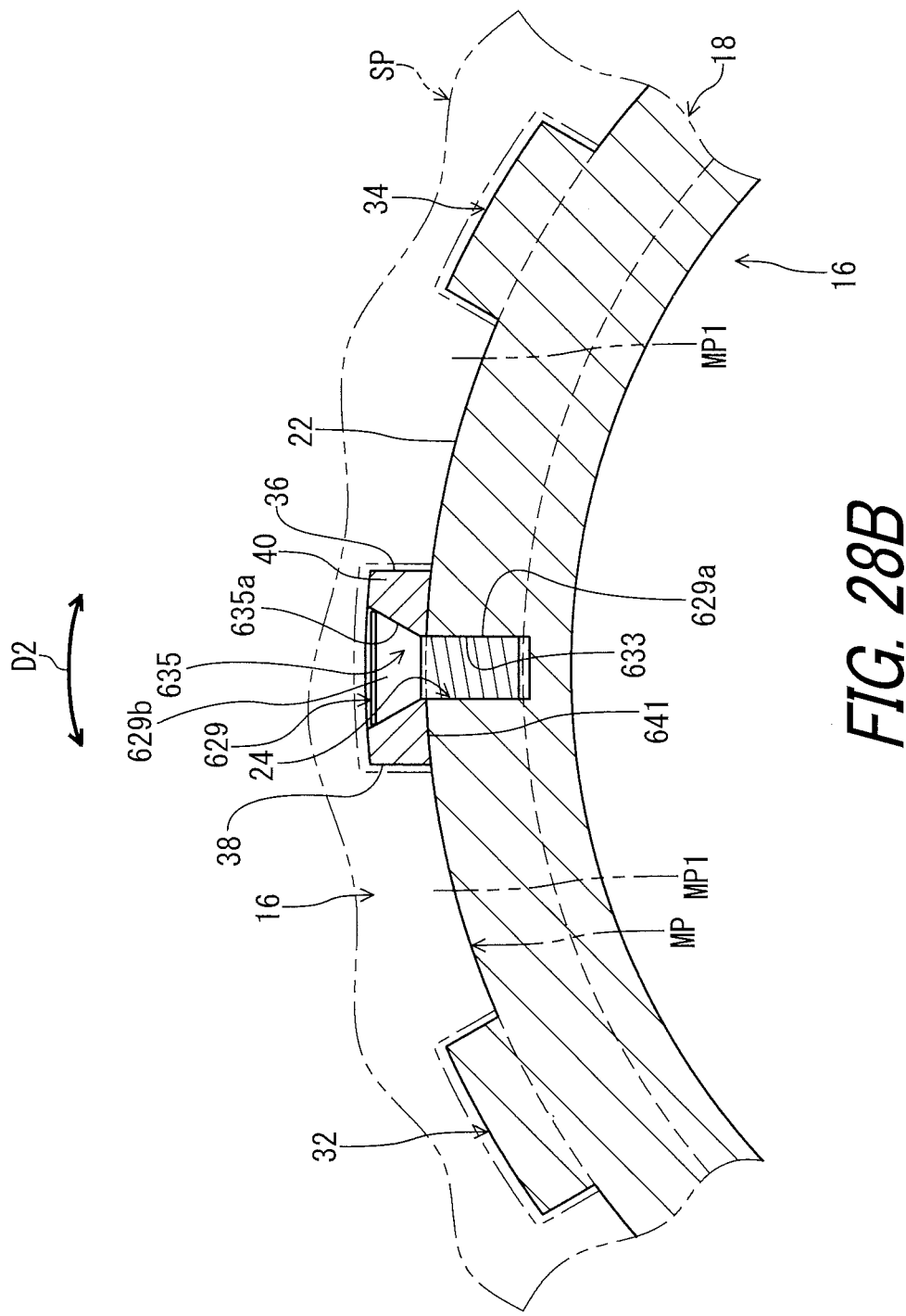
FIG. 28B is a cross-sectional view of the sprocket supporting member illustrated in FIG. 27 taken through securing member 629.

As seen in FIGS. 28A and 28B, the first tooth 620 includes the tooth body 40 but does not include the protrusions described in the above embodiment. The securing member 628 includes an externally threaded part 628a configured to be screwed in the threaded hole 630. The securing member 629 includes an externally threaded part 629a configured to be screwed in the threaded hole 633.

The first tooth 620 includes an attachment through-hole 631 through which the securing member 628 extends. For example, the securing member 628 is a countersunk bolt, and the attachment through-hole 631 includes a tapered surface 631a. The securing member 628 includes a head portion 628b provided at an end of the externally threaded part 628a. The head portion 628b is provided within the attachment through-hole 631.

The first tooth 620 includes an attachment through-hole 635 through which the securing member 629 extends. For example, the securing member 629 is a countersunk bolt, and the attachment through-hole 635 includes a tapered surface 635a. The securing member 629 includes a head portion 629b provided at an end of the externally threaded part 629a. The head portion 629b is provided within the attachment through-hole 635. The securing member 629 has substantially the same shape as that of the securing member 628. The attachment through-hole 635 has substantially the same shape as that of the attachment through-hole 631.

The tooth body 40 includes an inner peripheral surface 641 facing the outer peripheral surface 22 of the sprocket support member 16. In the illustrated embodiment, the inner peripheral surface 641 contacts the outer peripheral surface 22 of the sprocket support member 16 in a state where the first tooth 620 is attached to the tubular portion 18. The inner peripheral surface 641 can be bonded to the outer peripheral surface 22 of the sprocket support member 16 with bonding material such as adhesive if needed and/or desired.

With the bicycle hub assembly 610, it is possible to obtain the same advantageous effect as the bicycle hub assembly 10 in accordance with the first embodiment.

It will be apparent to those skilled in the bicycle field from the present disclosure that the constructions of the above embodiments can be at least partially combined with each other if needed and/or desired.

In the present application, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle hub assembly comprising:
   a hub axle;
   a hub shell rotatable relative to the hub axle about a rotational axis; and
   a sprocket supporting member rotatable relative to the hub axle about the rotational axis and configured to support a bicycle sprocket to be integrally rotatable with the sprocket supporting member about the rotational axis, the sprocket supporting member comprising:
      a tubular portion including an outer peripheral surface and an attachment portion provided only radially inward of the outer peripheral surface, the tubular portion being made of a first material; and
      a first tooth configured to be attached to the attachment portion of the tubular portion and made of a second material different from the first material, the first tooth comprising:
         a first surface configured to face a mounting portion of the bicycle sprocket in a circumferential direction of the sprocket supporting member; and
         a second surface opposite to the first surface in the circumferential direction, the second surface being configured to face the mounting portion of the bicycle sprocket in the circumferential direction,
         wherein the first tooth is positioned relative to the tubular portion in the circumferential direction only by the attachment portion.

2. The bicycle hub assembly according to claim 1, wherein
   the attachment portion includes a recess provided on the outer peripheral surface of the tubular portion, and
   the first tooth includes
      a tooth body including the first surface and the second surface, the tooth body being configured to be provided on the outer peripheral surface of the tubular portion in a state where the first tooth is attached to the tubular portion with the attachment portion, and
      a protrusion protruding from the tooth body and configured to be disposed in the recess.

3. The bicycle hub assembly according to claim 2, wherein
   the recess extends in an axial direction parallel to the rotational axis.

4. The bicycle hub assembly according to claim 2, wherein
   the recess has a maximum circumferential length such that the protrusion is press-fitted in the recess.

5. The bicycle hub assembly according to claim 2, wherein
   the sprocket supporting member includes a second tooth radially outwardly protruding from the outer peripheral surface of the tubular portion and made of the first material, and
   the tooth body has a shape substantially equal to a shape of the second tooth in an axial region where the mounting portion of the bicycle sprocket engages with the tooth body and the second tooth.

6. The bicycle hub assembly according to claim 3, wherein
   the first tooth has a longitudinal axis parallel to the axial direction in a state where the first tooth is attached to the tubular portion with the recess and the protrusion, and
   the tooth body and the protrusion extend along the longitudinal axis.

7. The bicycle hub assembly according to claim 6, wherein
   the tooth body has a first maximum axial length defined along the longitudinal axis,
   the protrusion has a second maximum axial length defined along the longitudinal axis, and
   the second maximum axial length is shorter than the first maximum axial length.

8. The bicycle hub assembly according to claim 2, wherein
   the tooth body has a first maximum circumferential length defined in the circumferential direction in a state where the first tooth is attached to the tubular portion with the recess and the protrusion,
   the protrusion has a second maximum circumferential length defined in the circumferential direction in a state where the first tooth is attached to the tubular portion with the recess and the protrusion, and
   the second maximum circumferential length is shorter than the first maximum circumferential length.

9. The bicycle hub assembly according to claim 2, wherein
   the tooth body has a first maximum circumferential length defined in the circumferential direction in a state where the first tooth is attached to the tubular portion with the recess and the protrusion,
   the protrusion has a second maximum circumferential length defined in the circumferential direction in a state where the first tooth is attached to the tubular portion with the recess and the protrusion, and
   the second maximum circumferential length is equal to the first maximum circumferential length.

10. The bicycle hub assembly according to claim 2, wherein
    the attachment portion includes a first inner surface and a second inner surface spaced apart from the first inner surface in the circumferential direction, and
    the protrusion includes
       a first circumferential end surface configured to face the first inner surface in the circumferential direction, and
       a second circumferential end surface configured to face the second inner surface in the circumferential direction.

11. The bicycle hub assembly according to claim 10, wherein
    the first circumferential end surface of the protrusion is disposed on a plane defined by the first surface of the tooth body, and the second circumferential end surface of the protrusion is disposed on a plane defined by the second surface of the tooth body.

12. The bicycle hub assembly according to claim 2, wherein
the tooth body includes an inner peripheral surface facing the outer peripheral surface of the sprocket support member,
the attachment portion includes a first inner surface,
the protrusion includes a first circumferential end surface configured to face the first inner surface in the circumferential direction, and
the inner peripheral surface of the tooth body and the first circumferential end surface of the protrusion are positioned on a downstream side of the protrusion in a driving rotational direction of the sprocket support member.

13. The bicycle hub assembly according to claim 12, wherein
the inner peripheral surface of the tooth body is substantially perpendicular to the first circumferential end surface of the protrusion.

14. The bicycle hub assembly according to claim 3, wherein
the first tooth has a longitudinal axis parallel to the axial direction in a state where the first tooth is attached to the tubular portion with the attachment portion, and
the first tooth at least partially has a substantially T-shaped cross-section taken along a plane perpendicular to the longitudinal axis.

15. The bicycle hub assembly according to claim 3, wherein
the first tooth has a longitudinal axis parallel to the axial direction in a state where the first tooth is attached to the tubular portion with the attachment portion, and
the first tooth at least partially has a substantially L-shaped cross-section taken along a plane perpendicular to the longitudinal axis.

16. The bicycle hub assembly according to claim 1, wherein
the attachment portion includes a plurality of recesses provided on the outer peripheral surface of the tubular portion, and
the first tooth includes
a tooth body including the first surface and the second surface, the tooth body being configured to be provided on the outer peripheral surface of the tubular portion in a state where the first tooth is attached to the tubular portion with the attachment portion, and
a plurality of protrusions protruding from the tooth body and configured to be respectively disposed in the plurality of recesses.

17. The bicycle hub assembly according to claim 1, further comprising:
a securing member with which the first tooth is to be secured to the attachment portion.

18. The bicycle hub assembly according to claim 17, wherein
the attachment portion includes a threaded hole, and
the securing member includes an externally threaded part configured to be screwed in the threaded hole.

19. The bicycle hub assembly according to claim 1, wherein
the first material has a hardness lower than a hardness of the second material.

20. The bicycle hub assembly according to claim 1, wherein
the first material comprises an aluminum alloy, and
the second material comprises an iron alloy.

21. The bicycle hub assembly according to claim 1, wherein
the sprocket supporting member includes
a second tooth radially outwardly protruding from the outer peripheral surface of the tubular portion and made of the first material, and
a third tooth radially outwardly protruding from the outer peripheral surface of the tubular portion and made of the first material, the third tooth being spaced apart from the second tooth in the circumferential direction, and
the attachment portion is provided between the second tooth and the third tooth in the circumferential direction.

22. The bicycle hub assembly according to claim 21, wherein
a distance defined between the attachment portion and the second tooth in the circumferential direction is substantially equal to a distance defined between the attachment portion and the third tooth in the circumferential direction.

* * * * *